April 19, 1938. L. O. CARLSEN 2,114,627
MACHINE FOR PRODUCING GEARS
Filed Dec. 26, 1934 21 Sheets-Sheet 4

Inventor
Leonard O. Carlsen
By
[signature]
Attorney

April 19, 1938. L. O. CARLSEN 2,114,627
MACHINE FOR PRODUCING GEARS
Filed Dec. 26, 1934 21 Sheets-Sheet 9

Inventor
Leonard O. Carlsen
By
B. Schlesinger
Attorney

April 19, 1938.  L. O. CARLSEN  2,114,627
MACHINE FOR PRODUCING GEARS
Filed Dec. 26, 1934   21 Sheets-Sheet 11

Inventor
Leonard O. Carlsen
By
BHSchlesinger
Attorney

April 19, 1938.  L. O. CARLSEN  2,114,627
MACHINE FOR PRODUCING GEARS
Filed Dec. 26, 1934  21 Sheets-Sheet 13

Inventor
Leonard O. Carlsen
By
Attorney

April 19, 1938.　　　　L. O. CARLSEN　　　　2,114,627
MACHINE FOR PRODUCING GEARS
Filed Dec. 26, 1934　　　21 Sheets-Sheet 16

Inventor
Leonard O. Carlsen
By
B. F. Schlesinger
Attorney

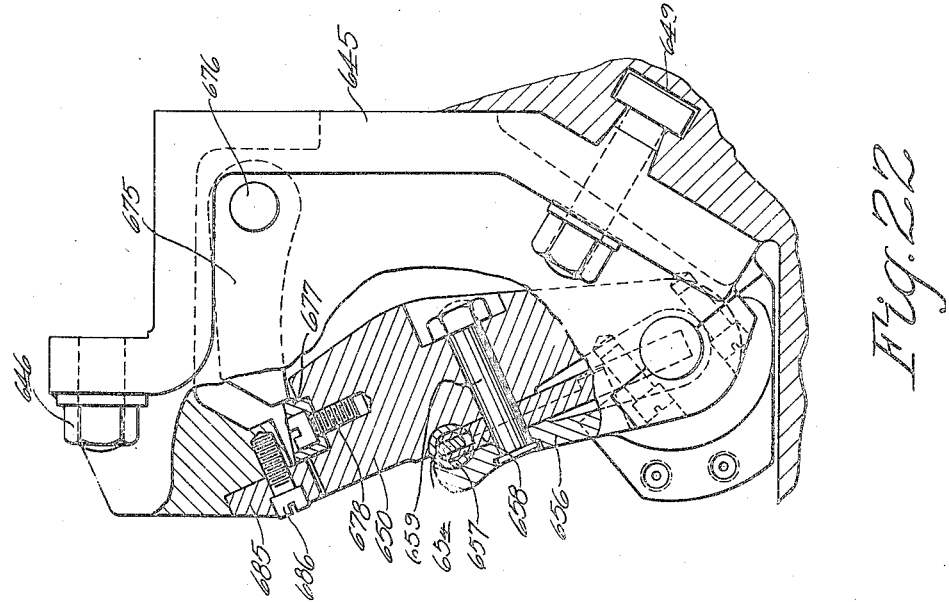
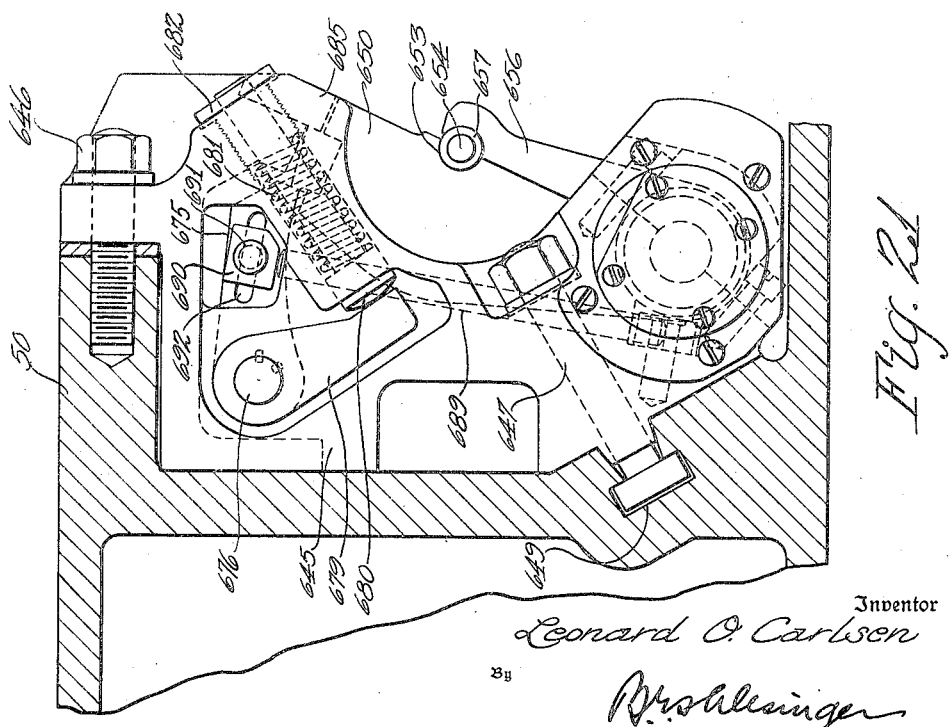

April 19, 1938.  L. O. CARLSEN  2,114,627
MACHINE FOR PRODUCING GEARS
Filed Dec. 26, 1934    21 Sheets-Sheet 18

Inventor
Leonard O Carlsen
By
B. Schlesinger
Attorney

Patented Apr. 19, 1938

2,114,627

UNITED STATES PATENT OFFICE 2,114,627

MACHINE FOR PRODUCING GEARS

Leonard O. Carlsen, Rochester, N. Y., assignor to Gleason Works, Rochester, N. Y., a corporation of New York Application December 26, 1934, Serial No. 759,183

45 Claims. (Cl. 90—4)

The present invention relates to machines for producing gears and especially to machines for producing gears, on which the profile shapes of the gear teeth are produced by a relative rolling movement between the tool and the work. In a still more specific aspect, the invention relates to machines for rough cutting gears and particularly to machines for rough cutting spiral bevel and hypoid pinions.

One object of the invention is to provide a gear-cutting machine in which the feed motion between the tool and work required for cutting teeth of the desired tooth depth is an angular movement and an overhead tie may be employed to connect the work and tool ends of the machine to make the machine more rigid.

A further object of the invention is to provide a machine in which the angular feed movement is effected hydraulically and is applied to the work so as to permit both the withdrawal movement for periodical indexing and the withdrawal movement for dechucking of a completed gear and chucking of a new blank to be applied to the same part, thereby simplifying construction of the machine and restricting overhang of the cutter to a minimum.

A further object of the invention is to provide a gear cutting machine in which the feed mechanism operates directly behind the part being fed and approximately in line with the point of cutting so as to obtain a smoother and steadier feed.

A still further object of the invention is to provide a machine for producing gears in a rolling operation in which the angular feed movement is effected through pivotal movement of the work spindle about the axis of one of the gears in the train of gearing driving the work spindle so that back-lash in the gear train may be taken up during the feed movement with the result that when the roll commences there will be no back-lash in the train and consequently the tool, from the very beginning of the roll, will remove the amount of stock desired.

A further object of the invention is to provide a gear cutting machine in which the angular feed movement of the work is effected by movement of the work spindle about an axis that lies intermediate the ends of the work spindle whereby to reduce the number of gears required in the train for driving the work spindle.

Another object of the invention is to provide a machine for producing gears in a rolling operation in which the rate of roll is varied automatically and in predetermined fashion during cutting so as to enable the tool to cut more efficiently and remove more nearly the same amount of stock throughout the whole of the roll.

Still another object of the invention is to provide a machine for producing gears in a rolling operation in which the complicated reversing mechanisms heretofore required are eliminated and the reversals of the cradle and the work spindle at the ends of the generating and return rolls, respectively, are effected very simply by reversal of a rack from which the trains of gearing for oscillating the cradle and the work spindle are driven.

A still further object of the invention is to provide a gear cutting machine in which the generating train is of such character that one turn of the gearing, which drives the work spindle and cradle, is sufficient to roll the work far enough relative to the tool to allow generation of the working part of a tooth, thereby eliminating eccentricity in the members of the train as a factor in the accuracy of the tooth being cut.

Still another object of the invention is to simplify the gear train which drives the work spindle while maintaining the essential universality that characterizes a generating machine having a gear drive. This is accomplished by employing a notched-plate index mechanism while using change gears to vary the ratio of roll between the work and the tool.

A further object of the invention is to provide a generating machine in which still further simplification can be attained by combination of mechanical operating means with fluid pressure actuated parts.

Another object of the invention is to provide means for taking up back-lash in the gear train driving the work spindle during cutting which will also prevent the changing thrusts, arising from the fact that with the ordinary face-mill gear cutter, successive cuts are taken on opposite sides of the teeth, from affecting the accuracy or the finish of the gear being produced.

A still further object of the invention is to provide a machine for cutting spiral bevel and hypoid gears in which the adjustment of the face-mill gear cutter for spiral angle is effected through rotational adjustment of the carrier in which the cutter is journaled, but in which the use of telescoping shafts in the drive to the cutter are eliminated.

Still another object of the invention is to provide an outboard support or tail-stock for supporting the work, that will function to hold the work more rigidly during cutting and that may be readily moved to and from operative position.

A further object of the invention is to provide a gear cutting machine in which the tail-stock is moved automatically out of operative position and the work dechucked when the cutting operations on the work are complete.

The invention also includes various other improvements and refinements having to do with machinery for producing gears, all of which will appear clearly from the following description and from the appended claims when read in conjunction with the accompanying drawings.

In the drawings:

Fig. 21 is a fragmentary sectional view through the work head, looking at one end of the outboard support or tail-stock;

Fig. 22 is a similar view looking at the other end of the tail-stock, parts being broken away for clearness of illustration;

Figure 1:
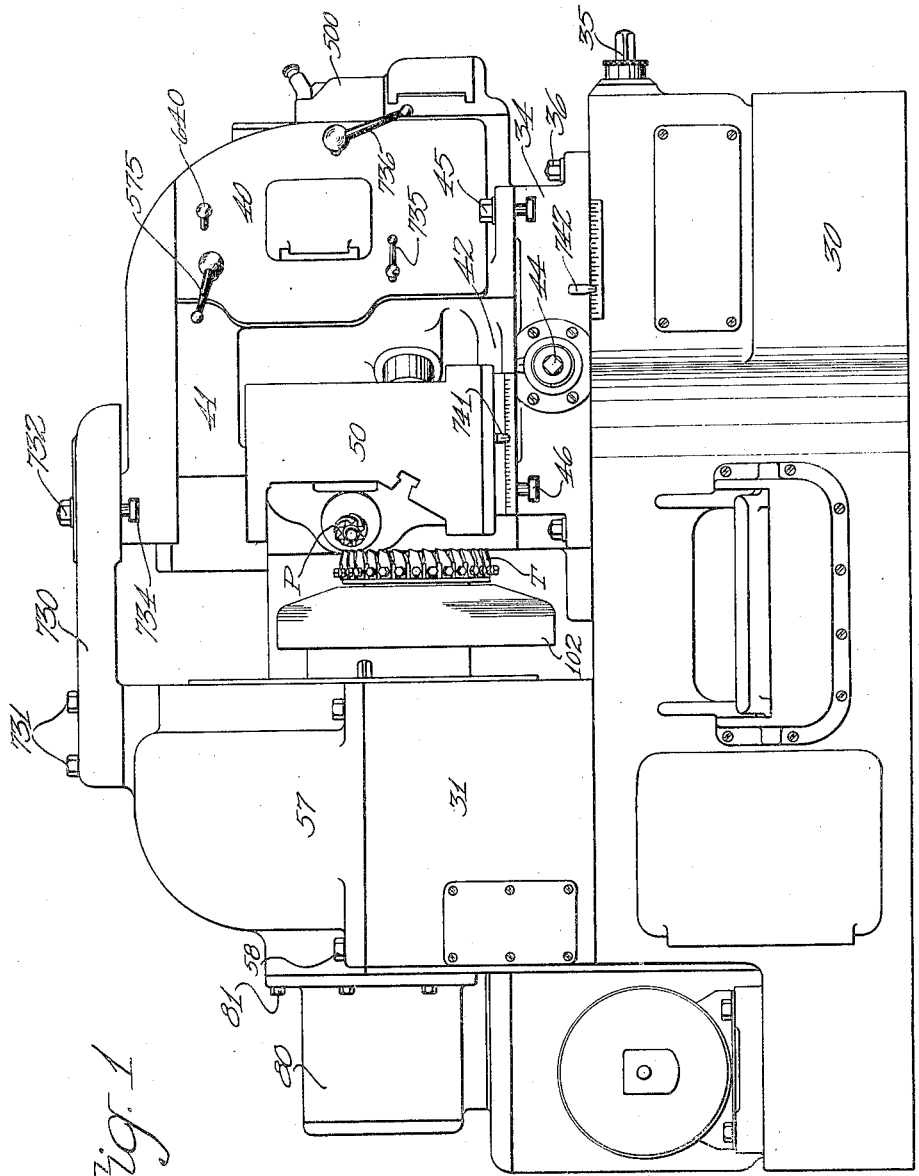
Fig. 1 is a side elevation of a spiral bevel and hypoid pinion cutting machine built according to the present invention.

In the machine illustrated, a face-mill gear cutter is employed as the cutting tool. The cutter is adjustably mounted upon a cradle which is oscillated in time with the rotation of the work spindle, during cutting, to produce the generating roll. The work spindle is journaled in a work head that has a pivotal movement alternately to feed the work into the cutter and withdraw the same from the cutter to permit indexing.

The roll and feed mechanisms are hydraulically actuated and are so inter-connected that the piston which controls the feed movement trips the piston which controls the roll movement and vice versa. In operation, the machine cycle is: first, feed of the work into operative position, then roll of the work and cutter together in one direction to cut a tooth space of the blank, then withdrawal of the blank from operative position and finally return roll of the blank and cradle during which the blank is indexed. This cycle is repeated for each tooth space of the blank until all of the tooth spaces have been cut. Then the machine is stopped and the blank is withdrawn automatically to chucking position.

There is an outboard support or tail-stock provided on the work head to assist in holding a pinion blank more rigidly during cutting. Hydraulically operated means is provided for disengaging this tail-stock and swinging it out of the way automatically, when the pinion has been completed and during the time the work head is being withdrawn to loading position, so as to permit immediate access to the pinion when the work head is at loading position. The machine may also be arranged so that the work is dechucked automatically while the work head is being moved to loading position.

The rotational movements of the cradle and work spindle are derived from the reciprocating movements of a pair of racks which are connected together and are actuated by the roll piston. Separate trains of gearing transmit the motions of these racks to the cradle and work spindle, respectively. A pair of bevel gears constitutes the final drive to the cradle itself and a pair of hypoid gears the final drive to the work spindle. These drives provide slow-running generating trains and with this type of drive it is entirely feasible to provide a feed-variation during the generating cycle so that, during the first part of the roll when the greater portion of the stock is being removed from a tooth space, a slow uniform rate of roll may be maintained, while during the latter part of the roll, the roll can be speeded up to increase the amount of stock removed over that removed where there is a uniform rate of roll through the generating cut. This allows of removal of more nearly uniform amounts of stock throughout the whole of the roll.

The feed movement of the work is a swinging feed about the axis of the hypoid pinion which forms part of the final drive to the work spindle. This pinion is mounted so that its axis lies at a point intermediate the length of the work spindle and between the work spindle and the plane of cut of the tool. With the axis of swing so located, the work will be fed into the tool in a direction substantially perpendicular to the root line of the work.

The swinging feed movement about the axis of the hypoid drive pinion operates, during the feed, to take up the back-lash in the gear train driving the work spindle, with the result that when the tool engages the work, there is no looseness in this gear train and the work is held solidly against the tool.

A further means is provided for taking up back-lash in the gear train during the generating roll. This is in the form of a hydraulic brake which is mounted on the work spindle and operates on the train of gearing that drives the work spindle. There is a drum formed in the work head and there is a lug or projection which is secured to the work head and extends into this drum. The lug forms a partition wall in the drum.
A paddle member is secured to the hypoid gear that drives the work spindle and this paddle member also extends into the drum. It is of such dimensions that, during rotation of the work spindle during cutting, fluid is entrapped between the paddle and the partition wall. A throttle valve is provided to control the escape of the entrapped fluid. Hence, a load is applied on the train of gearing driving the work spindle and so the back-lash in the train is taken up. This back-lash take-up is especially advantageous where a face-mill gear cutter is employed that is provided with cutting blades which are so arranged that successive blades cut on opposite sides of the tooth space, respectively. With such a cutter, the thrusts on the blank change in direction as successive blades engage the blank. The brake mechanism of the present invention takes up these thrusts and prevents the change in thrust from affecting the accuracy of the gear being cut.

The principal features of the invention and the method of operation of the machine shown in the accompanying drawings have been described in general terms. Reference will now be had to the drawings for a more detailed description of the invention and of this machine.

30 designates the base or bed of the machine. There is a column or upright 31 (Figs. 1 and 2) mounted on this base at one end thereof. The face-mill cutting tool T is mounted in this column as will hereinafter be described.

The upper surface of the other end of the base is formed to provide ways 32 which extend longitudinally of the base. There is a plate 34 mounted on the base 30 for longitudinal adjustment on these ways 32. Adjustment of the plate 34 on the ways 32 is effected by rotation of a screw-shaft 35 (Fig. 1), which is journaled in the base and which threads into a nut that is secured to the plate 34. This is known construction and has not been illustrated in detail. The plate 34 is secured in any adjusted position on the base by T-bolts 36 which engage in longitudinal T-slots 37 formed in the ways 32.

The plate 34 is formed with ways 38 which extend at right angles to the ways 32. There is a column or upright 40 mounted on the plate 34 to slide on the ways 38. This column 40 is provided with upper and lower integral projections or wings 41 and 42, respectively.

The column 40 is adjusted on the plate 34 by rotation of the screw-shaft 44 which is journaled in the plate 34 and which threads into a nut (not shown) that is secured to the column 40. The column 40 is secured in any position of its lateral adjustment on the plate 34 by T-bolts 45 and 46 which engage in T-slots 47 formed in the ways 38. The T-bolts 46 pass through the wing 42 of the column 40.

The work head 50 of the machine is mounted between the wings 41 and 42 of the column 40 and is angularly adjustable and pivotally movable in these wings. The means for effecting the angular adjustment and pivotal movement of the work head will be described later. The gear blank to be cut is secured to the work spindle of the machine which is journaled in the work head 50. In the drawings, the cutter is shown operating upon a pinion blank P.

The column 31 is provided with semi-cylindrical bearings 54 and 55 (Figs. 3 and 4) in which the cradle 56 of the machine is mounted. The cradle is held in position by a cap-member 57 which is secured to the column 31 by bolts 58. The cap-member 57 has semi-cylindrical bearing surfaces which cooperate with the bearing surfaces 54 and 55 and the cradle has, therefore, a full cylindrical bearing in the cap-member and column. The cutter T is secured in known manner to the cutter spindle 60. This is journaled on anti-friction bearings 61 and 62 in a sleeve 63 which is eccentrically mounted in a carrier 64. The carrier 64 is cylindrical in shape and is mounted in a cylindrical bearing 65 that is formed in the cradle 56 eccentrically of the axis of the cradle.

Figure 2:
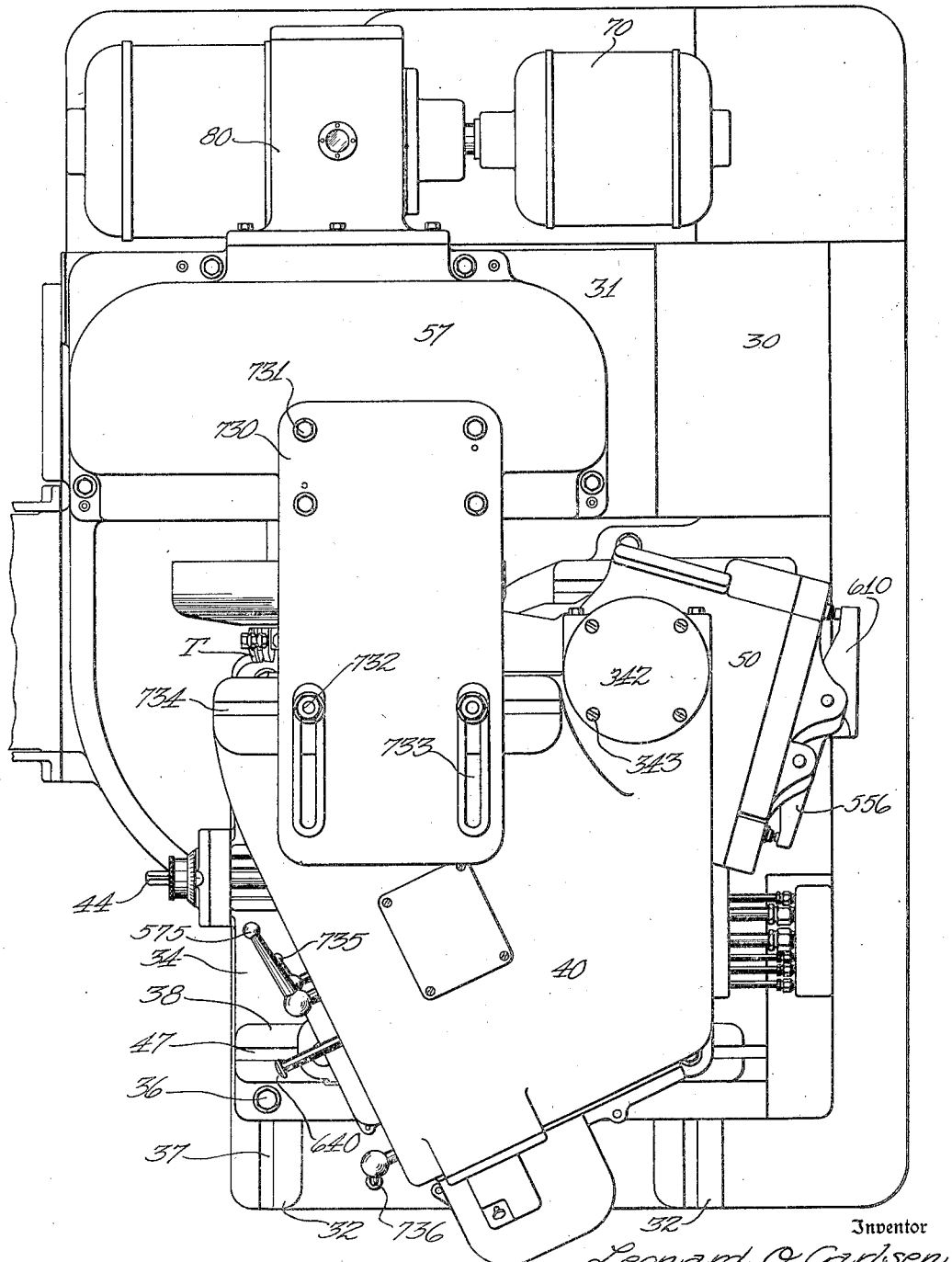
Fig. 2 is a plan view of this machine.
Figure 4:
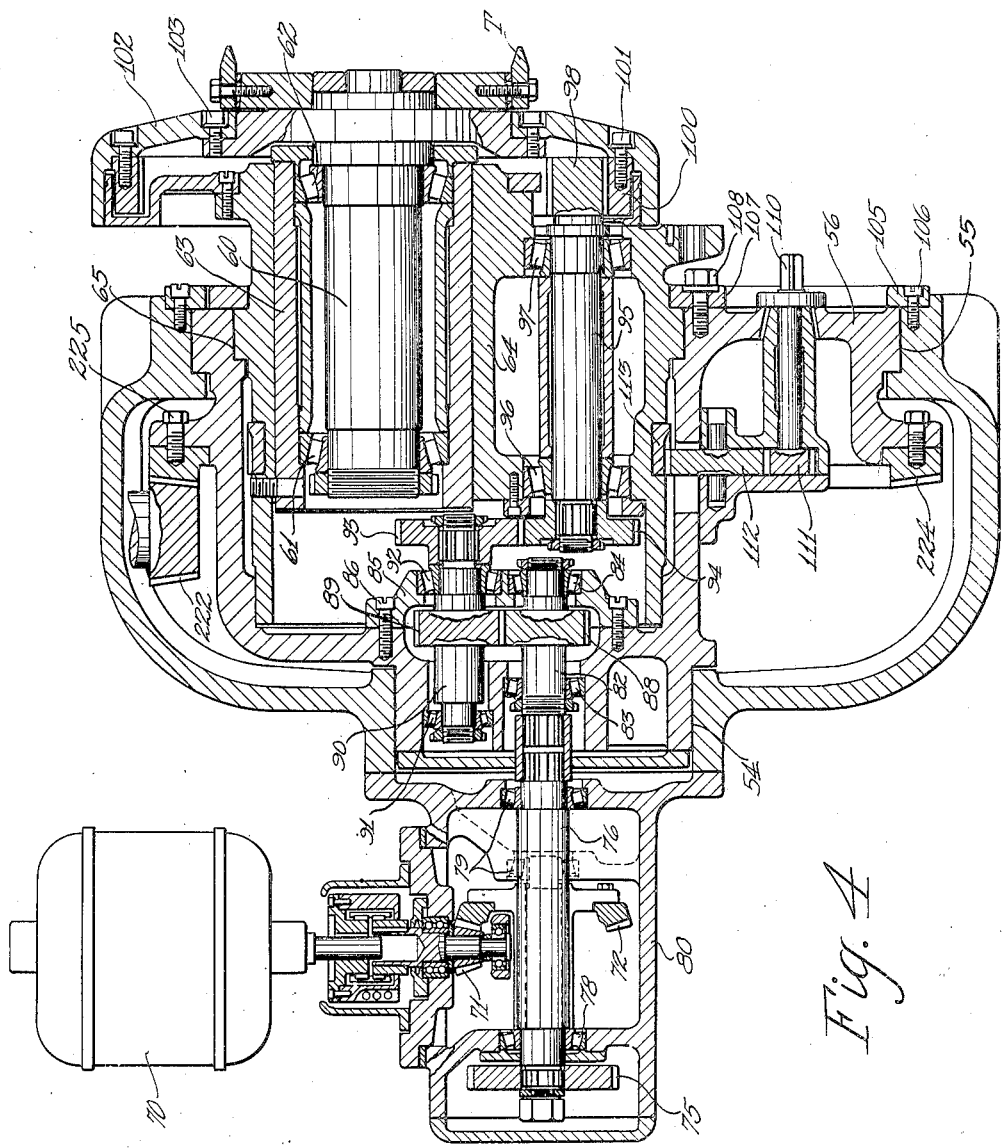
Fig. 4 is a horizontal sectional view of the parts shown in Fig. 3.
Figure 27:
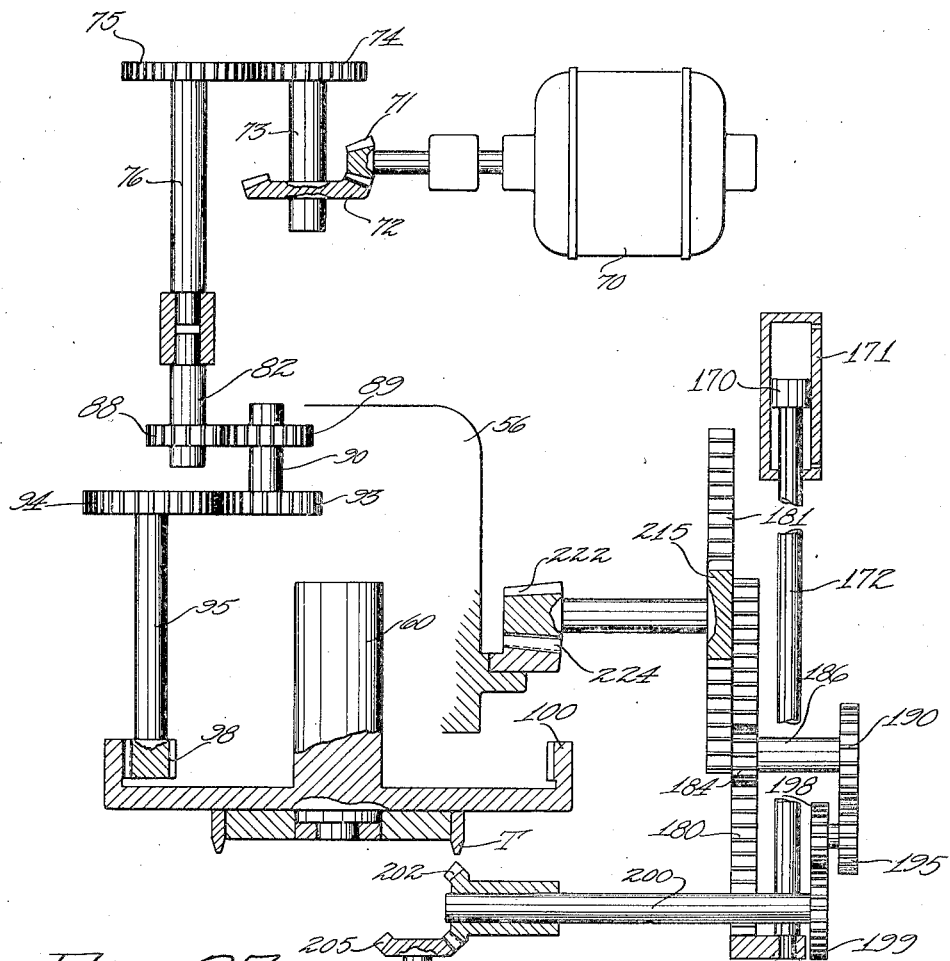
Fig. 27 is a drive diagram of the machine.

The cutter T is driven from a motor 70 which is mounted on the base of the machine. The armature shaft of the motor is connected by a flexible coupling of any suitable construction to a bevel pinion 71. This pinion meshes with a bevel gear 72 that is secured to a shaft 73. The shaft 73 carries at its outer end a spur gear 74, (Figs. 4 and 27). This spur gear meshes with a spur gear 75 which has splined engagement with a shaft 76 that is journaled on anti-friction bearings 78 and 79 in a housing 80. This housing 80 is secured by bolts 81 to the upright 31 (Figs. 1 and 2).

The shaft 76 is mounted to be coaxial with the axis of the cradle 56 and is coupled to a stub-shaft 82 that is also mounted coaxially of the cradle. The stub-shaft 82 is mounted on an anti-friction bearing 83 in the cradle and on an aligned anti-friction bearing 84 in a plate 85 which is secured by screws 86 to the cradle. There is a spur pinion 88 integral with the shaft 82. This pinion meshes with a spur gear 89 which is secured to a stub-shaft 90 that is journaled on anti-friction bearings 91 and 92 in the cradle and in the cover-plate 85, respectively.

The stub-shaft 90 is mounted coaxially of the cylindrical carrier 64. There is a spur gear 93 secured to the inner end of this shaft 90 and this spur gear meshes with a spur gear 94 that is secured to a shaft 95. The shaft 95 is journaled on anti-friction bearings 96 and 97 in the eccentric carrier 64.

At its inner end, the shaft 95 carries a spur pinion 98. This pinion is integral with the shaft 95 and meshes with an internal gear 100. The internal gear 100 is secured by screws 101 to a guard or fly-wheel 102 which is, in turn, secured by screws 103 to the head of the cutter spindle 60.

The cradle 56 is held against axial movement in the column 31 by a retaining-ring 105 which is secured to the column by screws 106. The carrier 64 is held against axial movement in the cradle by the retaining-ring 107 which is secured to the cradle by bolts 108. The carrier 64 is rotatably adjustable in the cradle, the adjustment being effected by rotation of the shaft 110 (Fig. 4). This shaft is journaled in the cradle and carries a spur pinion 111 which meshes with a spur gear 112. The spur gear 112 is also journaled in the cradle and it meshes with a spur gear 113 that is secured to the carrier 64. The cradle 56 is angularly adjustable in the column 31 as will hereinafter appear.

Adjustment of the carrier 64 in the cradle 56 varies the distance between the axis of the cutter spindle 60 and the axis of the cradle. In other words it provides an adjustment of the cutter radially of the axis of the cradle. The rotational adjustment of the cradle serves to change the angular position of the cutter about the axis of the cradle. The two adjustments together serve to position the cutter to cut a gear of any desired spiral angle. These two adjustments are not new. Heretofore, however, where these two adjustments have been employed on a spiral bevel or hypoid gear generating machine, telescoping shafts have been required in the drive from the drive motor to the cutter in order to take care of the changing positions of the cutter in adjustment. In the present machine, the use of telescoping shafts is eliminated. This advantageous result is accomplished by the special, described mounting of the shafts incorporated in the drive to the cutter. The shaft 82, as described, is mounted coaxially of the cradle and the shaft 90 coaxially of the carrier 64. In the angular adjustment of the carrier, the gear 94 revolves with the gear 93, travelling about the axis of the shaft 90 and in the angular adjustment of the cradle, the gear 89 revolves with the gear 88, travelling about the axis of the shaft 82. Thus, the drive to the cutter is maintained and still no telescoping shafts are required.

The retaining-ring 105 is graduated (Fig. 3) and the cradle 56 carries a vernier 115 whereby the angular adjustment of the cradle in the column may be made accurately and quickly. The retaining-ring 107 is also graduated and the carrier 64 also carries a vernier 116. Thus, angular adjustment of the carrier 64 can also be made accurately and quickly.

Figure 6:
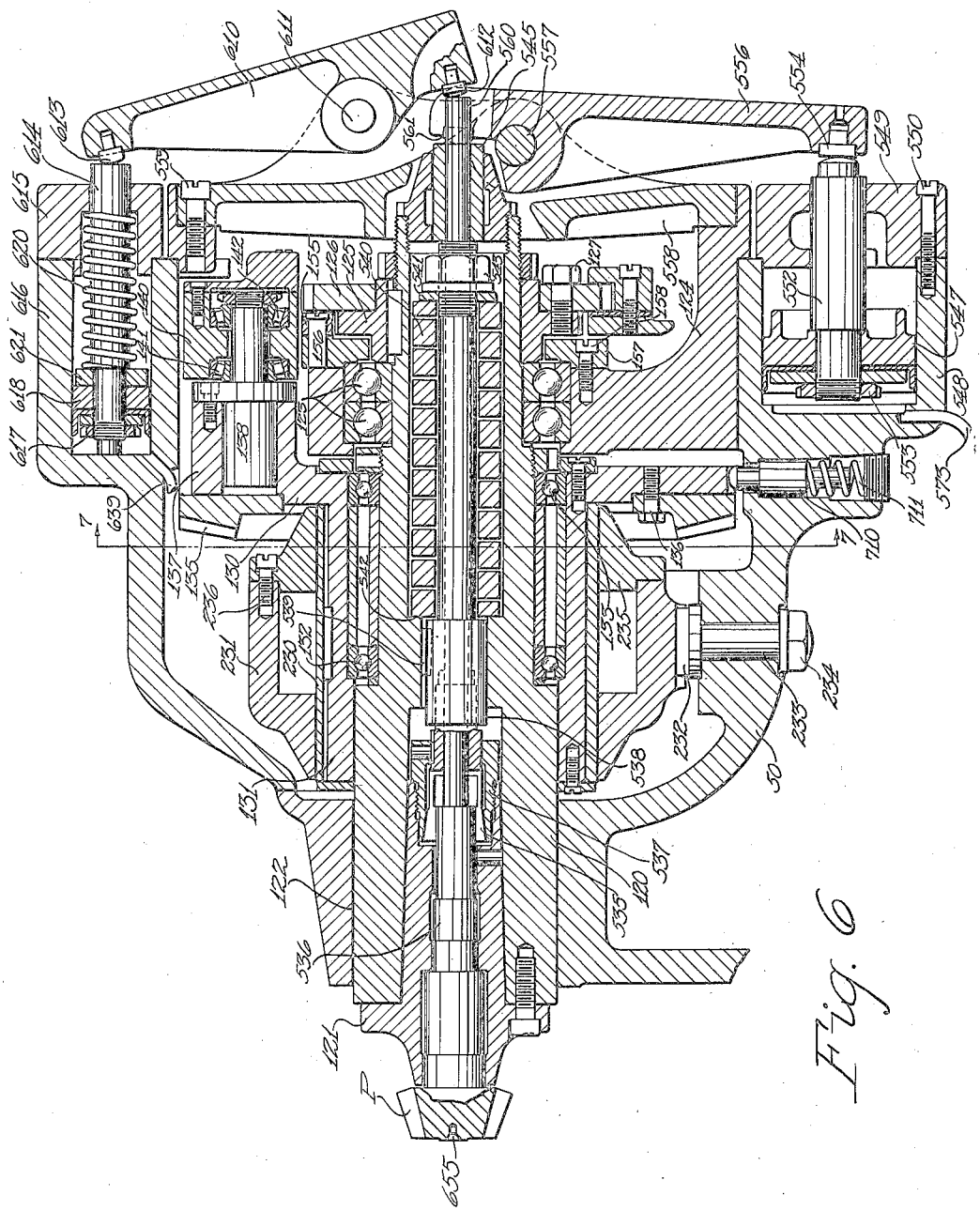
Fig. 6 is a sectional view taken diagonally through the work spindle and work head.

The work spindle of the machine is designated at 120 (Fig. 6). The work spindle has a taper bore to receive the arbor 121 in which the pinion P to be cut is secured. The work spindle is journaled at its forward end in a plain-bearing 122 in the work head 50 and at its rear end on anti-friction bearings 123 which are mounted in a bracket 124 that is secured in any suitable fashion to the work head.

There is a ratchet-wheel 125 (Figs. 6 and 11) keyed to the work spindle 120 beyond the rear bearings 123. A notched index-plate 126 is secured to the ratchet-wheel 125 by bolts 127.

There is a flanged member 130 (Fig. 6) rotatably mounted on the spindle 120. The hub 131 of this member is coaxial of the axis of the work spindle and is mounted on the work spindle on anti-friction bearings 132 and 133. There is a hypoid gear 135 secured by screws 136 to the flanged member 130. The flanged member 130 is formed on the side opposite that which carries the gear 135 with a boss 137 and in this boss there is mounted a stud or shaft 138.

There is an arcuate arm 140 (Figs. 6 and 11) pivotally mounted on the shaft 138 by anti-friction bearings 141 and 142. The arm 140 is a double-armed lever. There is a locking-dog 144 secured in the long arm of this lever by a screw 145 and pin 146. This locking-dog is adapted to engage successively in the notches of the index-plate 126. There is a trip-dog 147 pivotally mounted on a pin 148 in the short arm of this lever. This trip-dog is resiliently held in operative position by a spring-pressed plunger 149 that is housed in a boss formed on the hub of the lever-arm 140.

The locking-dog 144 is held in and is constantly urged into locking engagement with the index plate 126 by a spring-pressed plunger 150 which is housed in a boss formed integral with the member 130. This plunger engages a roller 151 that is secured in an arm 152 which is integral with the lever-arm 140 and lies behind the short-arm of this lever.

There is a pawl 155 pivotally mounted on a stud 156 which is secured in a retaining-ring 157 (Fig. 6). The retaining-ring 157 is secured to the arm 124 by screws 158. The pawl 155 is urged into engagement with the ratchet wheel 125 by a spring-pressed plunger 159. This plunger engages a lug formed on the pawl. There is a roller 160 mounted in the tail of the pawl 155. This roller engages with a cam-surface 161 formed on the lever-arm 140, when the locking-dog 144 is engaged with the index plate 126, so that when the locking-dog is in engagement with the index plate, the pawl is held out of engagement with the ratchet wheel. This is the position of the parts during cutting.

There is a trip-lug 165 secured to the housing 124 by a screw 166 and pin 167. This lug is secured in position to engage the trip-dog 147 as the lever-arm 140 rotates with the member 130 and hypoid gear 135. When the lever-arm 140 is rotating in a counter-clockwise direction, as viewed in Fig. 11, the trip-lever is rocked about its pivot pin 148 against the resistance of the spring 149 and so passes under the trip-lug 165. On the return clockwise movement of the lever 140, however, the trip-dog 147 travels along the beveled end-face of the trip-lug 165 and the lever 140 is rocked about its pivot stud 138, causing the dog 144 to be disengaged from the index plate. This allows the pawl 155 to engage the ratchet-wheel 125 under actuation of the spring plunger 159. This causes the work spindle to be held stationary although the member 130 will continue to rotate under actuation of the hypoid gear 135. Thus the lever 140 will rotate relative to the index plate 126 and will continue to do so until the locking-dog 144 comes into alignment with the next notch of the index plate. Then the spring pressed plunger 150 will return the locking-dog 144 into engagement with the index plate and lock the work spindle again to the member 130 and hypoid gear 135. The return of the locking-dog to locking position will cause the pawl 155 to be disengaged from the ratchet wheel because of engagement of the arm 140 with the roller 160 carried by the pawl.

During cutting, the index plate 126 is locked to the hypoid gear 135 by the locking-dog 144 to cause the work spindle to rotate with the hypoid gear and the work spindle and cradle rotate in timed relation to effect generation of the profiles of a tooth space of the gear being cut. When the sides of the tooth space have been completely generated, the work is withdrawn from engagement with the cutter and the hypoid gear and cradle are rotated back to their original position. It is during this return roll that the work spindle is indexed.

The rotational movements of the cradle and of the hypoid gear 135 in opposite directions and the reversals of movements of these two members are effected by reciprocation of a piston 170 (Fig. 12) that reciprocates in a cylinder 171 (Figs. 13 and 14) which is secured in the base of the machine. There is a piston-rod 172 integral with the piston 170. This piston-rod extends through a stuffing box 173 that closes one end of the cylinder 171. The other end of the cylinder 171 is closed by an end-plate 174. The free end of the piston-rod 172 is secured by the nut 175 to the depending arm 176 of a plate 177. The plate 177 slides on ways formed on the upper external face of the cylinder 171. There are two racks designated 180 and 181, respectively, secured to the upper face of the plate 177 by screws 182. The rack 180 has horizontally extending teeth, while the rack 181 has teeth which are inclined to the horizontal.

The rack 180 meshes with a spur gear 184. This spur gear is integral with the shaft 186 (Fig. 13) that is journaled on anti-friction bearings 187 and 188 in a bracket 195 which depends from the plate 34 and is secured thereto. There is a clutch-member 188 keyed to the outer end of the shaft 186. This clutch-member is adapted to engage with a clutch-member 189 that is rotatably mounted on the shaft 186 and that has driving engagement with a spur gear 190 which is also rotatably mounted on the shaft 186. The two clutch-members are held in engagement by a nut 192 and washers 193. The nut 192 is threaded on the end of the shaft 186.

The spur gear 190 meshes with a spur gear 195 (Figs. 13 and 27) that is secured to a sleeve which is journaled on a stud (not shown) which is mounted in a quadrant secured in the bracket 195. There is a second spur gear 198 keyed to this sleeve. This spur gear meshes with a spur gear 199 that is keyed to a shaft 200. The shaft 200 is journaled in anti-friction bearings 201 in the plate 34. It has splined engagement with a bevel gear 202. This bevel gear 202 has an integral hub which is journaled in anti-friction bearings 204 in the column 42. The bevel gear 202 meshes with the bevel gear 205 that is integral with the vertical shaft 207. The shaft 207 is journaled in the work head 50 (Figs. 13 and 7) on anti-friction bearings 208 and 209.

There is a hypoid pinion 210 keyed to the upper end of the shaft 207 and this hypoid pinion meshes with the hypoid gear 135. Thus, through the gearing described, rotation is transmitted to the hypoid gear 135.

The work can be adjusted angularly relative to the cutter by opening the clutch 188—189 (Fig. 13) and rotating the shaft 200. In the same way the work can be readjusted relative to the cutter after adjustment of the plate 34, for in the adjustment of the plate 34, the gear 184 will roll on the rack 180 and this alters the position of the work relative to the cutter.

The rack 181 (Figs. 12, 14 and 15) meshes with a spur gear 215. This spur gear is rotatably mounted upon an inclined shaft 216. It is adapted to be connected to the shaft 216 by a clutch-member 217 that has teeth on one face which engage with the teeth on the opposing face of the gear. The clutch-member is held in operative position by a nut 218 which threads onto the end of the shaft 216.

The shaft 216 is journaled in the base of the machine on anti-friction bearings 219 and 220. It has a bevel pinion 222 formed integral with it. This pinion meshes with a bevel gear 224 (Figs. 4, 14 and 27) that is secured by screws 225 to the cradle 56. Thus with the reciprocation of the piston 170 motion is transmitted to the cradle.

During cutting, especially with a cutter in which the blades are arranged so that successive blades cut on opposite sides of a tooth space, changing thrusts are likely to occur and are likely to affect the accuracy of the gear being cut as well as its finish. To avoid the effect of these thrusts, means is provided in the present invention for taking up the back-lash in the gear train which drives the work spindle. This back-lash take-up will now be described.

There is a sleeve 230 surrounding the hub 131 of the member 130 (Figs. 6 and 7) and keyed to this hub. Mounted to surround this sleeve is a housing 231. This housing is held against rotational movement relative to the work head 50 by a key 232 which is integral with the stud 233 that is secured in the work head 50 by the nut 234. A cover plate 235 is secured to the housing 231 by screws 236. The plate and the housing together form a hollow drum which is adapted to contain oil.

There is an arcuate lug or projection 237 secured to the inside wall of the housing 231 by the screw 238 and pin 239. This shoe 237 has fluid-tight engagement with the periphery of the sleeve 230 and with the end walls of the housing and plate 235. To assist in maintaining this fluid-tight engagement, there is a leather wiper 240 mounted in a recess in the shoe 237. This leather wiper is held in position by a block 241 that, in turn, is held in position by set screws 242.

Keyed to the sleeve 230 is a paddle-member 245. This paddle-member has fluid-tight engagement with the inside cylindrical wall of the drum 231 and it also has fluid-tight contact at opposite ends, respectively, with the side wall of the drum and the inside face of the cover-plate 235. To assist in maintaining the fluid-tight contact of the paddle 245 with the cylindrical inside wall 246 of the drum 231, the paddle 245 is recessed and there is a wiper 250 mounted in this recess. This wiper is held in position by a block 251 and set screws 252.

The oil or other motive liquid employed is admitted to the drum 231 from the line 255 through the duct 256 and it is exhausted from the drum through this same duct and line. The right-angular duct 257 simply serves to carry off any of the motive liquid which may leak past the partition-projection 237 or the paddle 245.

Figure 7:
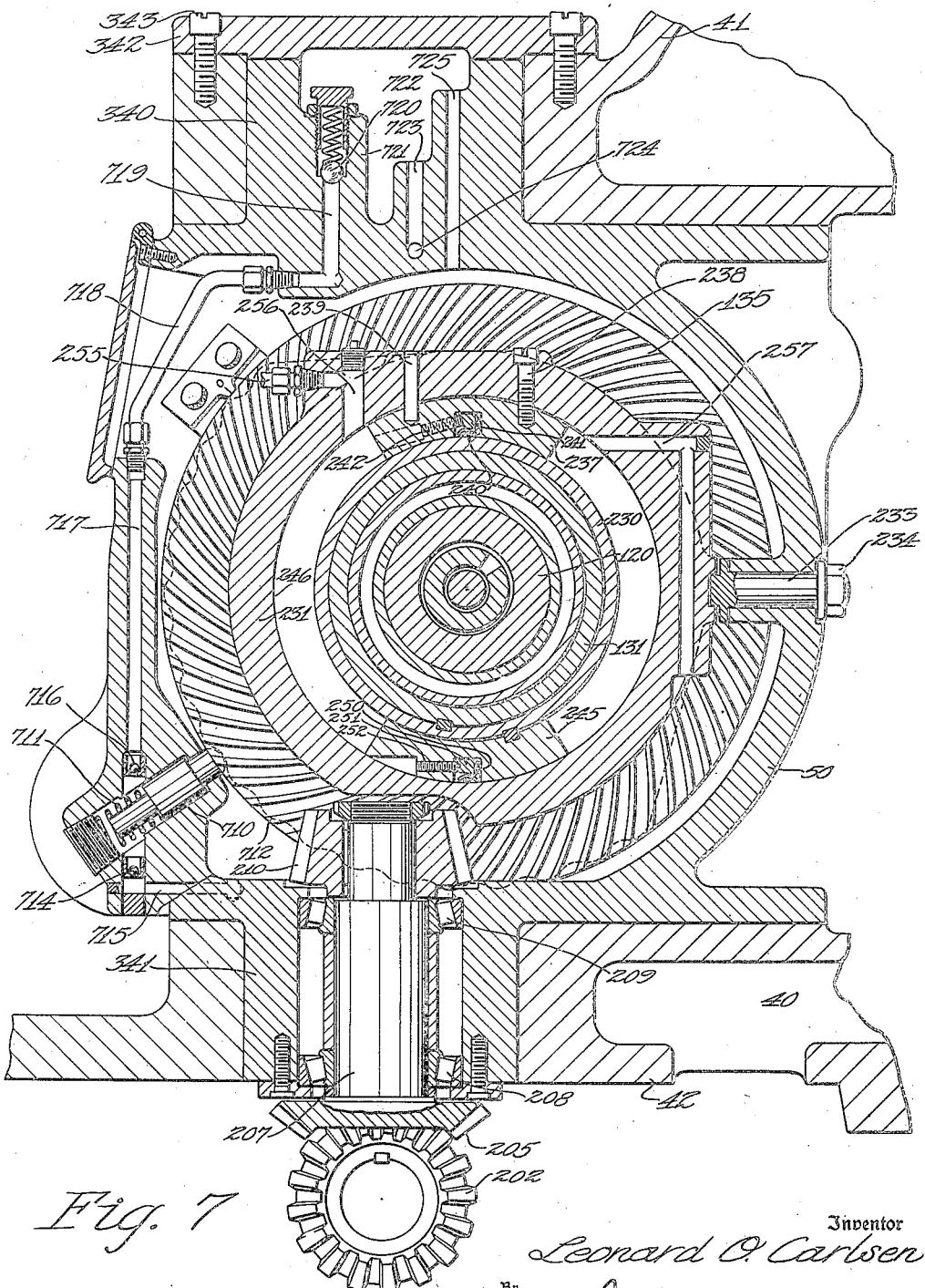
Fig. 7 is a sectional view taken on the line 7—7 of Fig. 6, looking in the direction of the arrows and showing, also, fragmentarily, the mounting of the work head and the drive to the work spindle.

The gearing of the machine is so selected that when the tooth space is being cut, the hypoid gear 135 is rotating in a clockwise direction as viewed in Fig. 7 which means that the paddle 245 is also rotating in the clockwise direction. Thus the liquid in the drum 231 is entrapped between the paddle 245 and partition 237 and is squeezed out through the duct 256 and line 255.

There is a throttle valve provided to control the rate of flow of the oil from the line 255, as will hereinafter be described. It will be evident that unless this throttle valve is fully open, a load will be put on the train of gearing driving the work spindle during cutting and thus any back-lash in this train will be taken up.

In the return roll of the machine, the work spindle is rotating in a counter-clockwise direction. The hydraulic control mechanism of the machine is so arranged that when the hypoid gear 135 is rotating in this direction, the line 255 and duct 256 will be on supply and the pressure liquid will be flowing into the drum 231 through this line and duct. In this way, the pressure of this liquid on the paddle 245 will tend to hold the teeth of all the gears in the gear train which drives the gear 135 against the same sides of the teeth of their mate gears as those against which they are held during cutting. Hence, in both directions of rotation, the drum 231 and co-operating mechanism tend to take up back-lash in the same direction in the train of gearing driving the work spindle.

Figure 14:
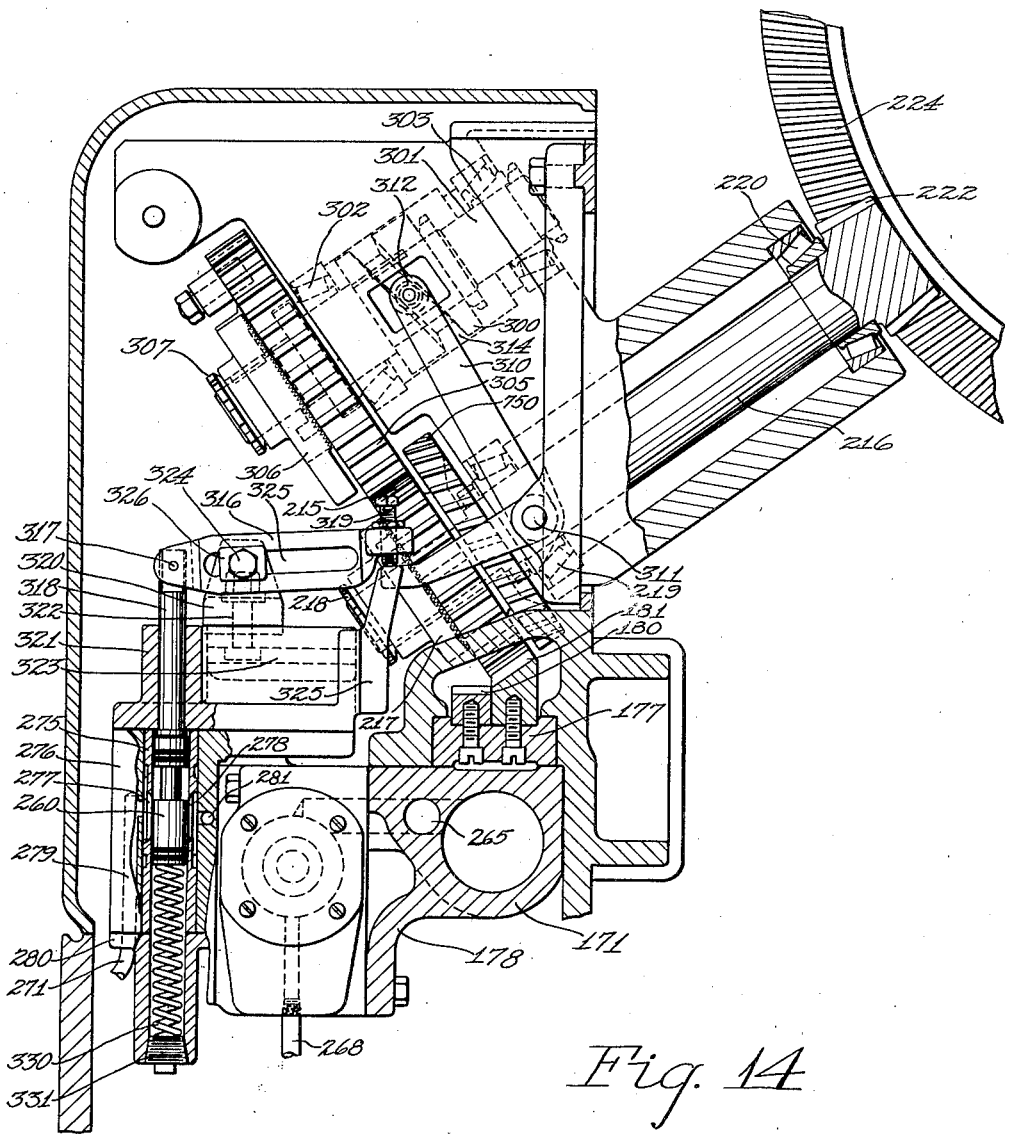
Fig. 14 is a fragmentary sectional view showing the drive connection between the other rack and the cradle and showing also details of the reversing mechanism for the racks and of the mechanism for controlling the rate of roll.
Figure 26:
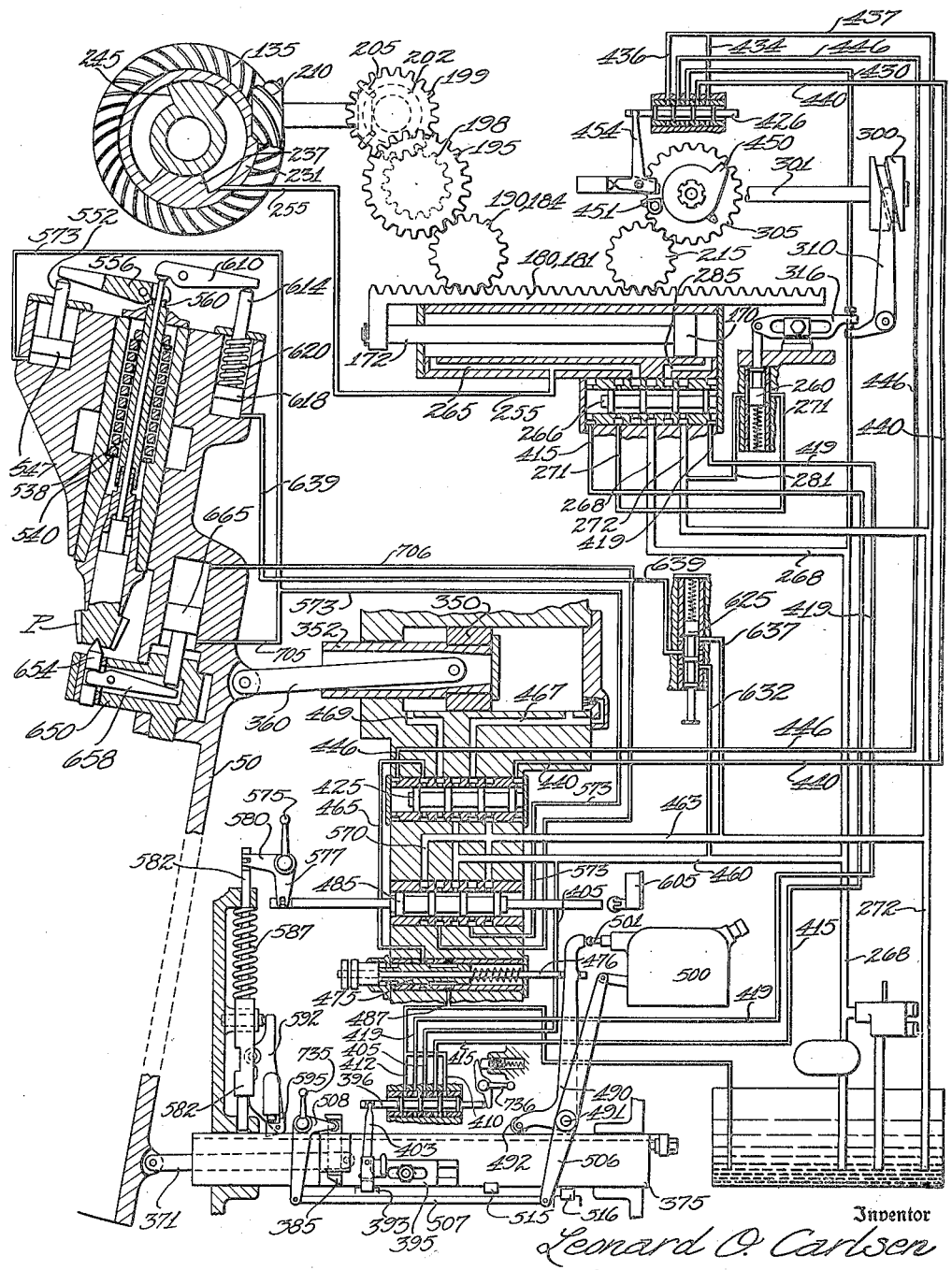
Fig. 26 is a diagrammatic view, illustrating the hydraulic circuit of the machine and its mode of operation.

The throttle valve, which controls the rate of rotation of the work spindle, as described, is shown in Figs. 14 and 26, and denoted at 260. This throttle valve controls not only the rotation of the work spindle but also the rate of movement of the main piston 170 during the generating roll as will now be described.

The duct 255 (Figs. 7 and 26) leading from the drum 231 connects with a duct 265 (Figs. 12 and 26) which connects one end of the cylinder 171 with a reverse valve 266. The valve 266 controls the direction of movement of the piston 170. Liquid under pressure is supplied to this valve from the pump, which is suitably located in the base of the machine, through a duct 268. This duct communicates with the radial ports 269 formed in the sleeve 270 in which the valve 266 is mounted and slides. The motive liquid is exhausted from the sleeve 270 either through the duct 271 or the duct 272.

The throttle valve 260 slides in a sleeve 275 (Figs. 14 and 26). This sleeve is mounted in a bore of a casting 276 that is fastened in any suitable manner to the casting 178 that houses the main piston 170 and the reverse valve 266. The sleeve 275 is provided at diametrically opposite points with port-openings 277 and 278.

The port-openings 277 communicate with a duct 279 and this duct is connected through an opening in the cover-plate 280 with the duct 271 which, as above described, conducts exhaust fluid from one end of the valve-sleeve 270. The other port 278 in the sleeve 275 communicates with a duct 281 which is drilled in the castings 276 and 178 and which leads into the other exhaust duct 272 of the valve-sleeve 270 (Figs. 12 and 14).

As already described, the reverse valve 266 is connected to one end of the cylinder 171 (Fig. 12) by the duct 265. It is connected to the opposite end of this cylinder by the duct 285.

Figure 12:
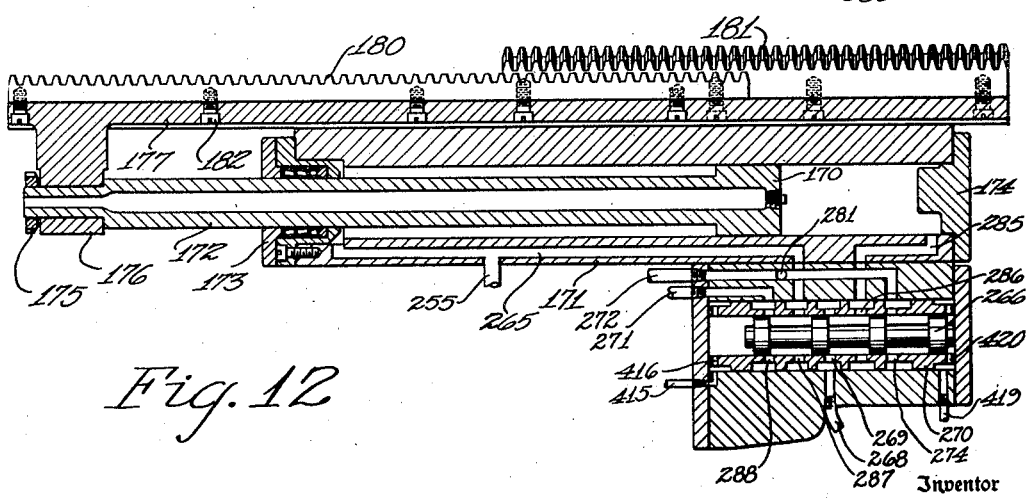
Fig. 12 is a fragmentary sectional view showing the racks which actuate the cradle and work spindle drives and the fluid pressure operated mechanism for controlling and actuating these racks.
Figure 13:
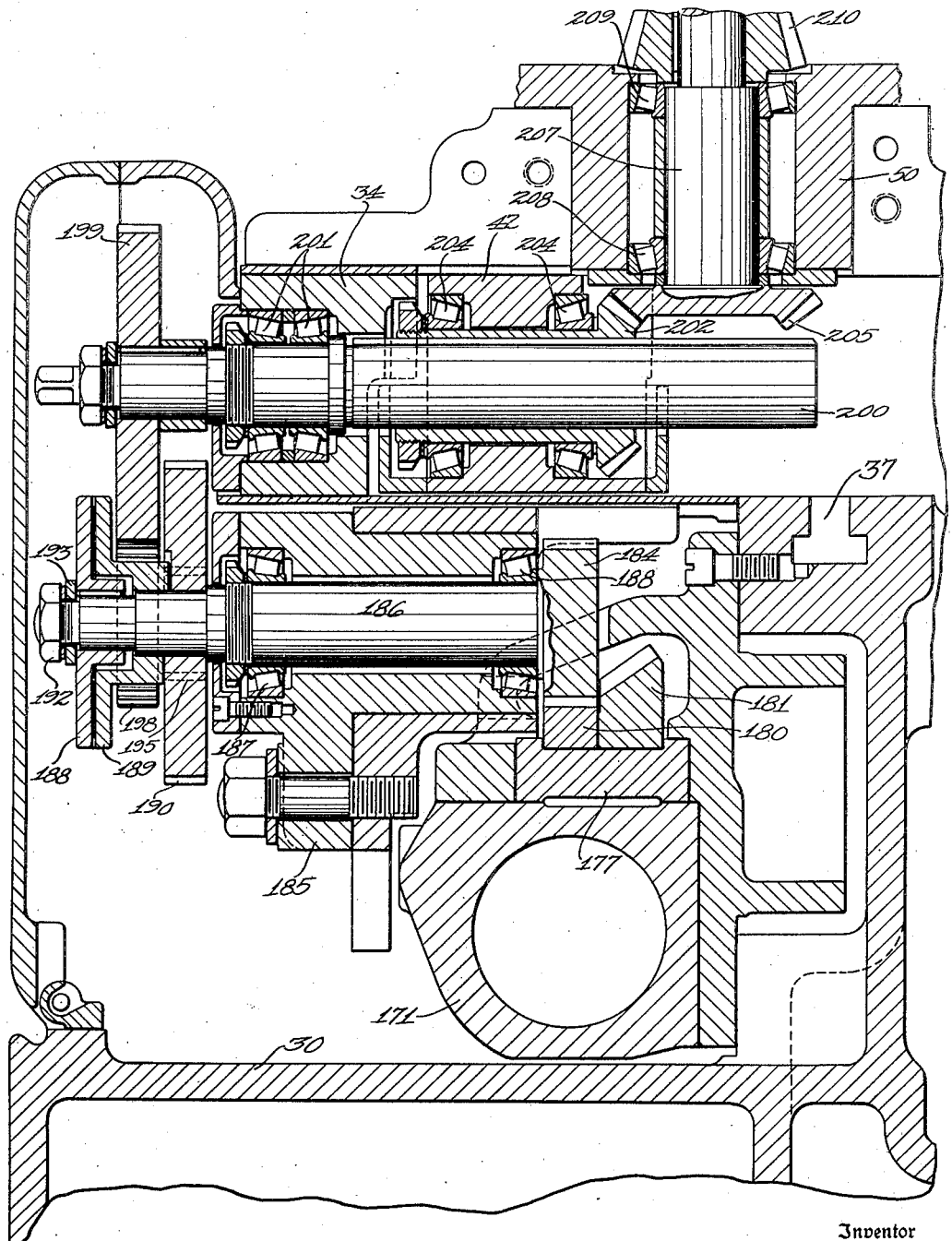
Fig. 13 is a fragmentary sectional view on an enlarged scale, showing the train of gearing connecting one of the drive racks with the drive to the work spindle. This view is taken at right angles to Fig. 7.

When the reverse valve 266 is in the position shown in Fig. 12, the pressure fluid flowing through the duct 268 will enter the sleeve 270 through the ports 269 and will flow out through the ports 286 and duct 285 into the right-hand end of the cylinder 171. At the same time, fluid will exhaust from the left-hand end of this cylinder through the duct 265 and ports 287 and 288 in the sleeve 270 into the exhaust line 271 that leads to the throttle valve 260. Thus, the piston 170 will move to the left from the position shown in Fig. 12.

This movement will be transmitted through the gearing 181, 215, 222 and 224 to the cradle (Figs. 12, 14 and 27). It will also be transmitted through the gearing 180, 184, 190, 195, 198, 199, 202, 205, 210 and 135 (Figs. 12, 13, 7 and 27) to the work spindle, which at this time is connected to the gear 135 by the index mechanism. This will cause the paddle 245 to rotate in a clockwise direction, as viewed in Fig. 7, and the liquid entrapped between the paddle 245 and the partition member 237 will be forced out of the drum through the ducts 256 and 255 into the duct 265 (Fig. 12) where it will join the liquid exhausting from the left-hand end of the cylinder 171 and will flow with that liquid through the ports 287 and 288 into the duct 271.

This duct 271 leads to the throttle valve 260, as above described, and the rate of flow of the liquid from the duct 271 is controlled by the position of this throttle valve. The exhaust liquid flows from the duct 271 through the ports 277 and 278 of the throttle valve into the duct 281 (Figs. 14 and 12) and thence through the duct 272 back to the sump. It will be seen, then, that the throttle valve controls not only the rate of movement of the piston 170, which controls directly the rate of generating roll of both the cradle and the work spindle, but also through operation of the hydraulic brake mechanism, puts a load on the train of gearing which drives the work spindle, causing the back-lash in the train of gearing between the hypoid drive gear 135 and the rack 180 (Figs. 7 and 12) to be taken up. Thus, through operation of the throttle valve, the work spindle and cradle can be rotated in timed relation at any desired rate and, at the same time, due to the taking up of the back-lash in the train of gearing which drives the work spindle, a steady drive is applied to the work spindle which holds the work up to the cut despite the shifting thrusts caused by alternate cutting first on one side of a tooth space and then on the other. Thus something is achieved which to my knowledge has never been achieved before in a spiral bevel gear cutting machine having a gear drive to the work spindle, namely, a drive in which the accuracy and finish of the work is wholly unaffected by the changing thrusts produced by successive blades of the face-mill gear cutter cutting successively on opposite sides of a tooth space.

A further result is achieved with my invention through the provision of means for controlling the movement of the throttle valve 260, which varies the opening of this valve during the generating roll in such way as to vary the rate of the generating roll, so that the cutter will remove more nearly uniform amounts of stock throughout the roll. In the ordinary gear cutting machine of the generating type, the rate of roll is uniform throughout cutting. Where a tooth space is being cut from a solid blank, this means that the load on the cutter will vary at different times during the roll. This will be clear from a consideration of Figs. 23 and 24.

Figure 23:
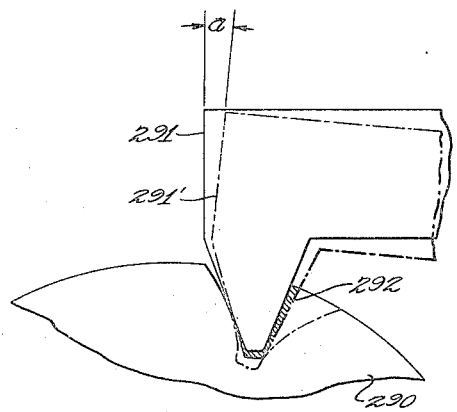
Fig. 23 is a diagrammatic view showing successive positions of the tool and blank in the first part of the roll in the cutting of a tooth space of the blank.
Figure 24:
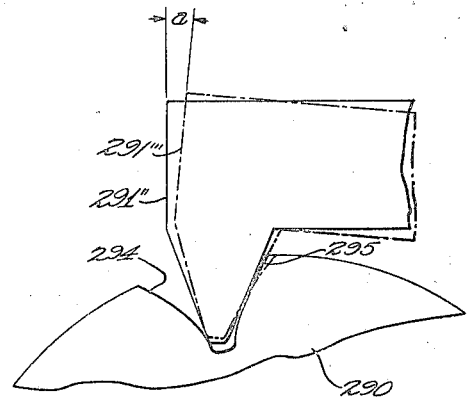
Fig. 24 is a diagrammatic view showing what successive positions of the tool and blank would be during the latter part of the roll were the roll to take place at a constant rate.

In these figures, 290 denotes the gear blank being cut and 291 the cutting tool which is here shown diagrammatically as a face-mill gear cutter. Fig. 23 shows successive positions of cutter and blank at the beginning of the roll, the cutter being in full lines at 291 in one position and in dotted lines at 291' in a succeeding position. Fig. 24 shows two further positions of the cutter and blank toward the end of the roll, the cutter being designated in these two positions at 291'' and 291''', respectively. The cutter and blank are assumed to be rolling at a uniform rate so that the angular distance $a$ between the positions 291 and 291' of the cutter is the same as the angular distance $a$ between the positions 291'' and 291''' and the blank. Now at the beginning of the roll, the cutter will cut into a solid blank and will cut on both sides. The stock removed between successive cuts in Fig. 23 is denoted at 292 and shown in shaded lines. When the gear and cutter have rolled together far enough, however, one side 294 of the tooth space being cut will have been fully generated and thereafter the cutter will operate on only one side of the tooth space and furthermore even on that side, the amount of stock removed by the cutter in successive cuts is reduced. This is shown clearly in Fig. 24, where the amount of stock removed between the successive cuts at 291'' and 291''' is shown in shaded lines and denoted at 295.

This is what happens where the rate of roll is uniform through the whole generating operation. It is evident, however, that, if the rate of roll is varied during generation, so as to cause the cutter to roll more rapidly after one side of the tooth has been generated, larger amounts of stock can be removed by the one side of the tool which continues in operation without placing an excessive burden on the cutter or on the machine. The present machine has been designed, therefore so that the rate of generating roll may be speeded up at any desired point in the roll, to cause the cutter to remove between successive cuts greater amounts of stock than would be removed were the rate of roll to remain uniform.

Figure 25:
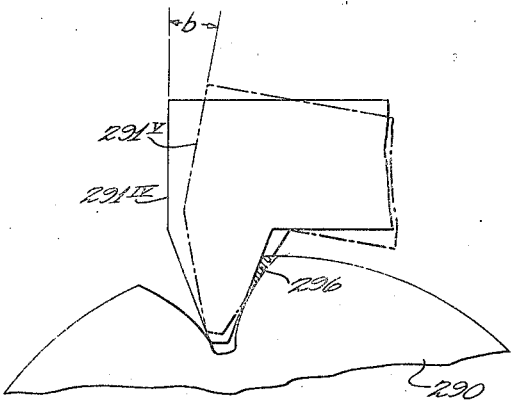
Fig. 25 is a diagrammatic view showing successive positions of tool and blank in the latter part of the roll in the present machine in which the roll is at a varying rate.

The operation of the present machine for the first part of the roll is preferably the same as that of generating machines of the ordinary type, but during the latter part of the roll, the rate of roll is increased. The result of this increase in the rate of roll is shown in Fig. 25. Here the blank being cut is again denoted at 290 while two successive positions of the cutter are denoted at 291$^{IV}$ and 291$^{V}$, respectively. It will be noted that the angular movement $b$ between successive positions of the cutter in Fig. 25 is greater than in Fig. 24. In other words, the rate of roll has been increased. The result is that a greater amount of stock, shown in shaded lines at 296, has been removed in successive cuts.

The position of the throttle valve 260 is controlled by a cam 300 (Figs. 14 and 26) which is secured to a shaft 301 that is rotatably mounted in the base of the machine on anti-friction bearings 302 and 303. The shaft 301 is driven in time with the cradle and work spindle, the drive to this shaft being from the rack 181 (Figs. 14 and 15) through the gear 215 and a gear 305. The gear 305 is rotatably mounted on the shaft 301, but is clutched thereto to rotate with the shaft during operation of the machine. The hub of the gear 305 is formed with fine clutch teeth on its front face and these teeth are engaged by fine clutch teeth formed on the opposing face of a clutch member 306 which is keyed to the shaft 301. The clutch member 306 is held in operative position by a nut 307 which threads on the outer end of the shaft 301.

There is a bell-crank lever 310 pivotally mounted in the base of the machine by means of the pin 311. There is a roller 312 mounted by means of the pin 313 in the long arm of this lever. This roller engages in the groove 314 of the cam 300. The short arm of the bell-crank lever 310 is adapted to engage a set-screw 315 (Fig. 18) which is adjustably threaded into one end of a lever 316. The other end of this lever is connected by the pin 317 with the stem 318 of the throttle valve 260.

The lever 316 is mounted upon an adjustable fulcrum which comprises a block 320 that is slidably mounted upon the upper face of the cover-plate 321. The fulcrum block 320 is secured in any adjusted position on the cover-plate by means of a T-bolt 322, the head of which engages in a T-slot 323 formed in the cover-plate. The bolt 324 forms the fulcrum for the lever 316. This bolt passes through the elongated slot 325 in the lever and the lever is secured to the bolt 324 by the clamping-plate 326.

Figure 18:
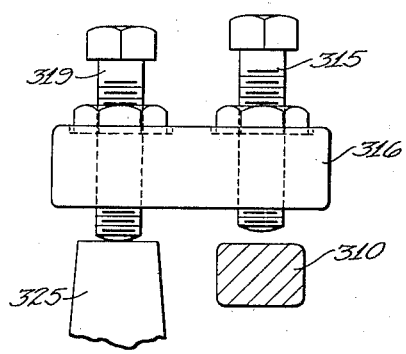
Fig. 18 is a fragmentary view, showing a detail of the mechanism for operating the roll throttle valve to control the rate of roll.

There is a second set-screw 319 (Fig. 18) threaded into the lever 316 alongside the set-screw 315. This set-screw engages a block 325 that is secured to the cover-plate 321 (Figs. 18 and 14). By adjusting this second set-screw, the distance of the set-screw 315 from the end of the lever 310 can be adjusted and so the point in the roll at which the lever 310 starts to move the lever 316 and the throttle valve 260 can be determined.

The throttle valve 260 is constantly urged toward closed position by the coil-spring 330 which is interposed between the bottom face of the valve and the inside face of the plug 331 that is threaded in the cover-plate 280. The cover-plate 280 is formed with a hollow boss which receives this spring and into which the plug 331 threads. The cover-plates 280 and 321 are secured to the casting 276 by screws (not shown).

The groove 314 of the cam 300 is a helical slot so that the lever 310 is in constant movement during the roll. The set-screw 319 is adjusted, as described, so that the lever 310 engages the set-screw 315 at the desired point in the roll. Until the lever 310 engages the set-screw 315, the rate of roll will be uniform being determined by the position of the set-screw 319. When the lever 310 engages the set-screw 315, however, it will start to rock the lever 316 and this will depress the throttle valve 260 against the resistance of the spring 330 to increase the area of opening of the throttle-valve, allow exhaust at an increasing rate from the left-hand end of the cylinder 171 and thus increase the rate of the generating roll.

In ordinary use, the set-screw 319 is adjusted so that the lever 310 will start to rock the lever 316 about 15° from the end of the roll. In an average pinion, which would require about 30° of generating roll to generate the tooth profiles, then, the speed-up point would come exactly halfway through the roll. In the case of a high spiral angle and a long face pinion, the required roll might be 45°. Thus the first 30° of the roll would be at a uniform rate. In the case of a low spiral angle and a short face job, as little as 20° of roll might be sufficient to generate the whole of both tooth profiles. In this case, only 5° of the roll would be at a uniform rate.

As has previously been described, the work head 50 is pivotally mounted in the column 40 (Figs. 1 and 7). The work head is formed with trunnions 340 and 341 that are mounted in plain bearings formed in the wings 41 and 42, respectively, of the column 40. The upper bearing is protected against dirt and grit by a cover-plate and gib 342 which is secured to the wing 41 by screws 343. The axis of the shaft 207 and of the hypoid pinion 210 mounted thereon coincide with the axis of the trunnions 340 and 341. The axis of the trunnions, which is designated at X is offset from the axis of the work spindle and lies between the axis of the work spindle and the plane of the cutting tool, as clearly shown in Fig. 5.

Figure 5:
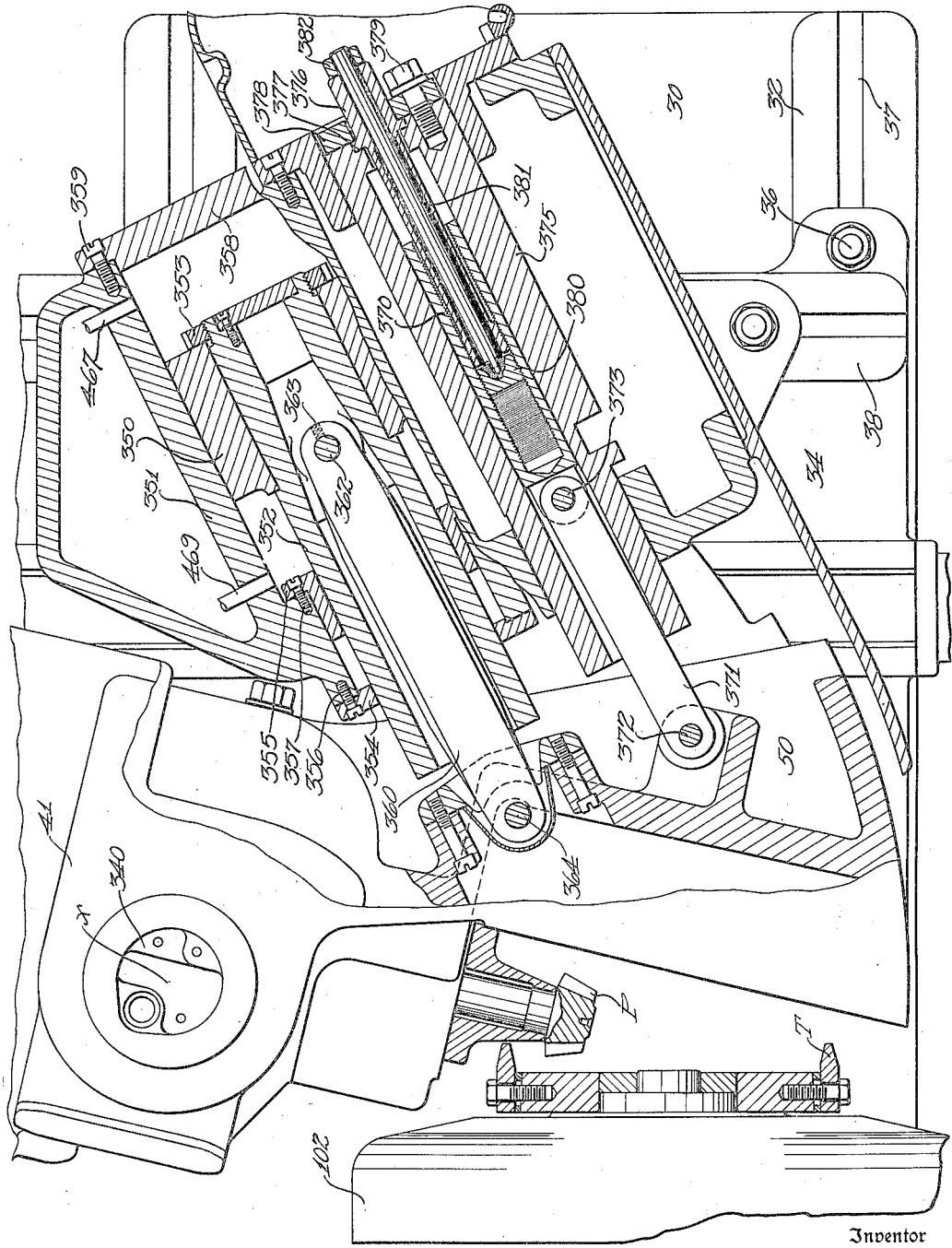
Fig. 5 is a fragmentary view, partly in plan and partly in section, and showing the feed mechanism for the work spindle and the operative relation of the cutter and the work.

In the present machine, the relative feed movement required to cut tooth spaces of the desired depth on the pinions is imparted to the work and it comprises a swinging movement about the axis of the trunnion bearings. The feed movement is produced by reciprocation of the piston 350 (Figs. 5 and 26). This piston reciprocates in a cylinder 351 formed in the column 40 (see Fig. 10).

The piston 350 is secured against a shoulder formed externally on a hollow piston-rod 352, by a nut 353 which threads onto this rod. The piston-rod 352 extends through an opening in one end-plate 354 of the cylinder 351 and it is guided in its movement by the bearing 355 which is mounted within the cylinder. The end-plate 354 and bearing 355 are secured to the cylinder by screws 356 and 357, respectively. The opposite end of the cylinder 351 is closed by a cover-plate 358 which is secured to the cylinder by screws 359.

The piston-rod 352 is connected to the work head 50 by a link-member 360. This link extends within the bore of the piston-rod 352 and is connected to the piston-rod by a pivot pin 362 and set-screw 363. It is connected at its opposite end to the work head 50 by the pivot pin 364. Thus, movement of the piston 350 forward or backward causes a corresponding swinging movement of the work head into or out of operative position.

The depth of feed, which varies, of course, for gears of different root angles, is determined by adjustment of a feed stop rod 370. This rod is connected to the work head 50 by a link 371 which has a pivotal connection at one end through a pin 372 with the work head and a pivotal connection at its opposite end through the pin 373 with the stop rod. The stop rod is adjustable longitudinally in the bore of a stop-bar 375, but the rod is adapted to be fixedly connected to the bar, after it has been adjusted.

Adjustment of the rod 370 in the bar 375 is effected by rotation of a sleeve-member 376. This member is held against axial movement relative to the bar 375, being provided with a shoulder or flange 377 which is held against a seat formed on the bar by an end-plate 378 which is secured to the bar by bolts 379. The stop rod 370 has a central bore which is threaded internally and the sleeve 376 threads into this central bore of the rod 370. By rotating the sleeve 376, then, the rod 370 can be adjusted axially in the bar 375. This determines the depth of feed of the gear blank being cut, as will appear hereinafter. The sleeve 376 is locked in position after adjustment by a lock-nut 380 which threads into the bore of the rod 370 and which is connected to a rod 381 that is centrally disposed in the sleeve-member 376. The rod 381 extends through the sleeve-member and it is provided at its outer end with a suitably shaped head 382 to receive a wrench for rotating the rod.

Figure 8:
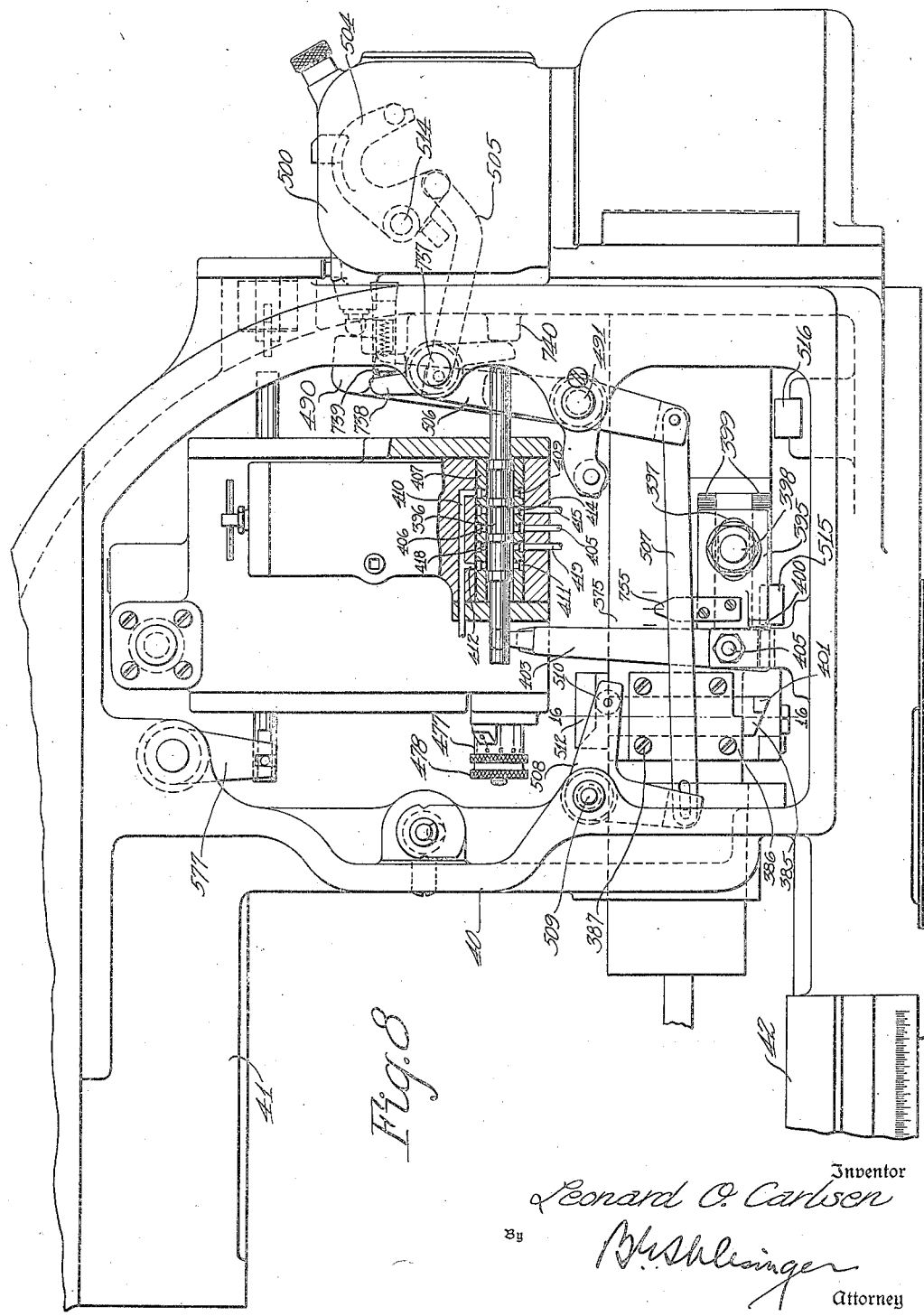
Figs. 8 and 9 are views taken in parallel vertical planes, of the column in which the work head is pivotally mounted.
Figure 16:
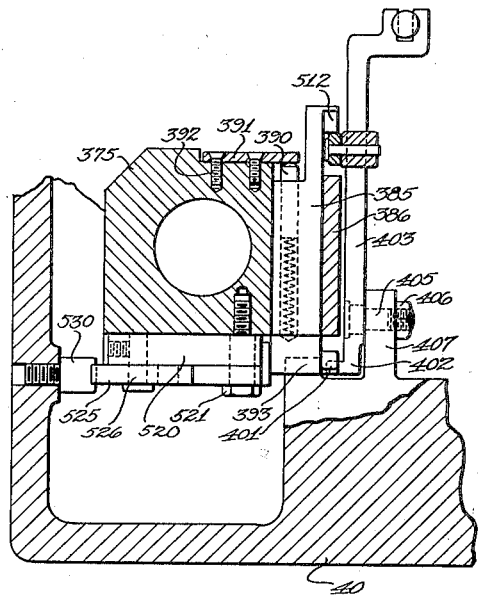
Fig. 16 is a fragmentary sectional view on the line 16—16 of Fig. 8.

The withdrawal movement of the work head periodically for indexing is limited by a stop 385 (Figs. 8, 16 and 26). This stop is slidably mounted in a keeper 386 which is secured to one side of the feed stop bar 375 externally thereof by screws 387. There is a spring-pressed plunger 390 carried by the stop member 385. This plunger engages a plate 391 which is secured by screws 392 to the stop bar 375. The plunger holds the stop member 385 resiliently in position where it will engage a lug 393 (Fig. 16) that is formed on the column 40. When the stop member 385 engages the lug 393, withdrawal movement of the work head for indexing is stopped.

The stop 385 cooperates with an adjustable stop-plate 395 to shift the roll pilot valve 396 alternately in opposite directions. The stop-plate 395 is adjustably secured to the stop-bar 375. The stop-plate 395 is formed with an elongated slot 397 through which passes a bolt 398 that threads into the stop-bar 375 and the stop-plate is formed with serrations on its under-face (not shown) which engage opposed serrations 399 formed on the outside face of the stop-bar 375. The stop-plate 395 is formed with a projection or lug 400 and the stop-member 385 is formed with a projection or lug 401 (Figs. 8 and 16). The projections 400 and 401 are adapted to engage alternately with a lug 402 formed on a lever 403, as the stop-bar 375 moves first in one direction and then in the other with the work head 50. The lever 403 is pivotally mounted on a pin 405 that is secured by the nut 406 in a lug 407 formed integral with the column 40.

The lever 403 is forked at its upper end as clearly shown in Fig. 16 and the furcations of the lever engage in recesses formed in the stem of the valve 396.

Fluid under pressure is supplied to the pilot valve 396 through a duct 405 (Figs. 8 and 26) and the radial ports 406. These ports are formed in the sleeve 407 in which the valve 396 reciprocates. The motive liquid is exhausted from the valve sleeve 407 either through the ports 409 and duct 410 or through the ports 411 and duct 412. The ducts 410 and 412 are connected and lead back to the sump of the machine. The valve 396 is connected with one end of the roll reverse valve 266 by ports 414 in the sleeve 407, the duct 415 and the ports 416 in the sleeve 270 (Figs. 8, 12 and 26). The valve 396 is connected with the opposite end of the roll reverse valve 266 through the ports 418 in the sleeve 407, the duct 419 and the ports 420 in the sleeve 270. Thus it will be seen that as the feed bar 375 moves back and forth, the lever 403 will be moved first in one direction and then in the other to reverse the pilot valve 396 and that the shifting of the pilot valve will cause fluid under pressure to be supplied first to one end and then to the other of the roll reverse valve 266, thereby reversing this latter valve. Thus, it will be seen that the movement of the work head under actuation of the piston 350 controls the reversal of the roll piston 170.

The reversal of the feed piston 350 is itself controlled by a reverse valve 425 (Figs. 9 and 26) and this reverse valve is, in turn, controlled by a feed pilot valve 426 (Figs. 15 and 26) which, in turn, is controlled from the movement of the roll piston 170, as will now be described.

Fluid under pressure is supplied to the feed pilot valve 426 from a duct 430 through radial ports 431 formed in a sleeve 432. The pilot valve 426 slides in this sleeve. The motive fluid is exhausted from the sleeve 432 either through the ports 433 and duct 434 or through the ports 435 and duct 436. The two ducts 434 and 436 connect with the same duct 437 and this leads back to the sump of the machine.

Figure 9:
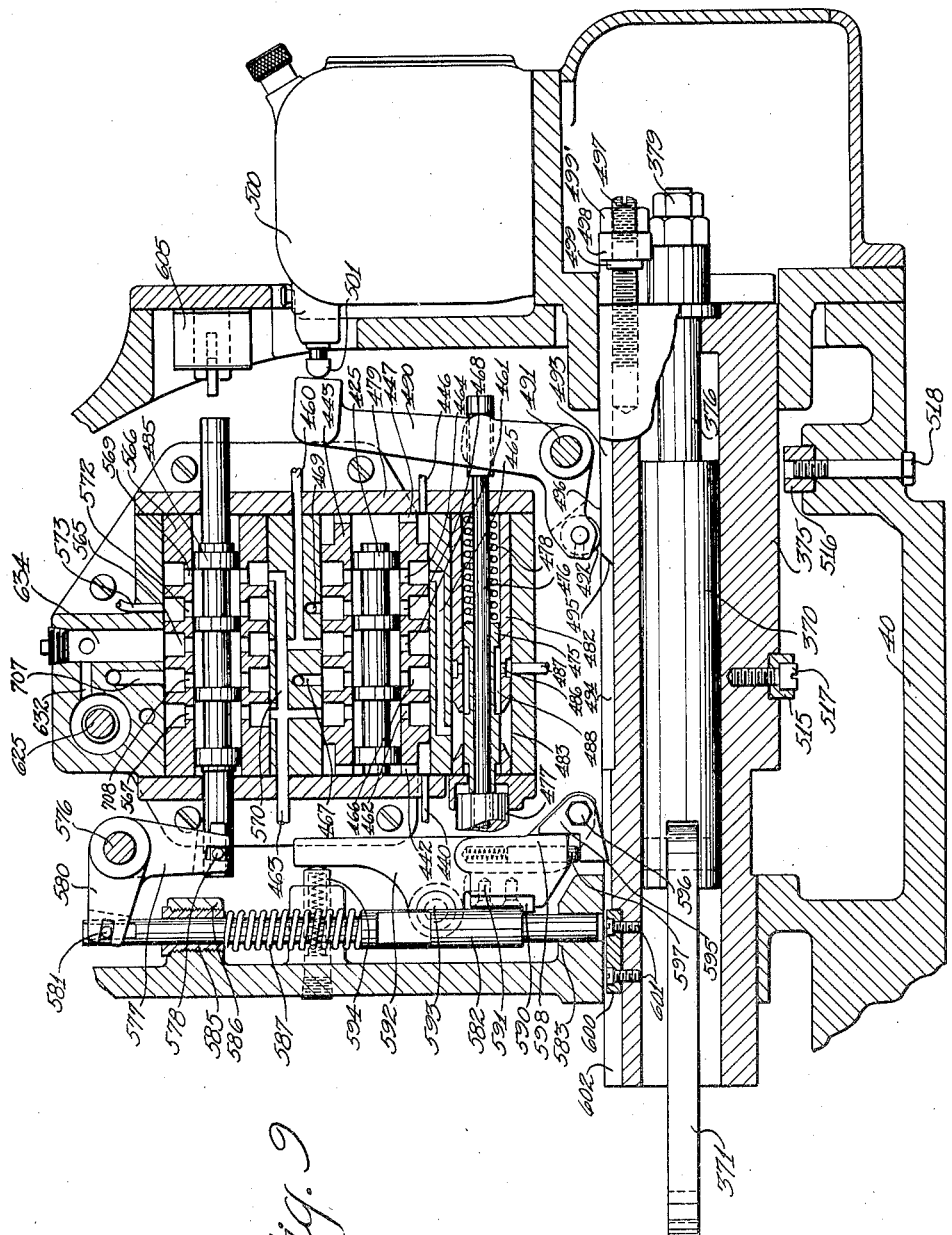
Figure 15:
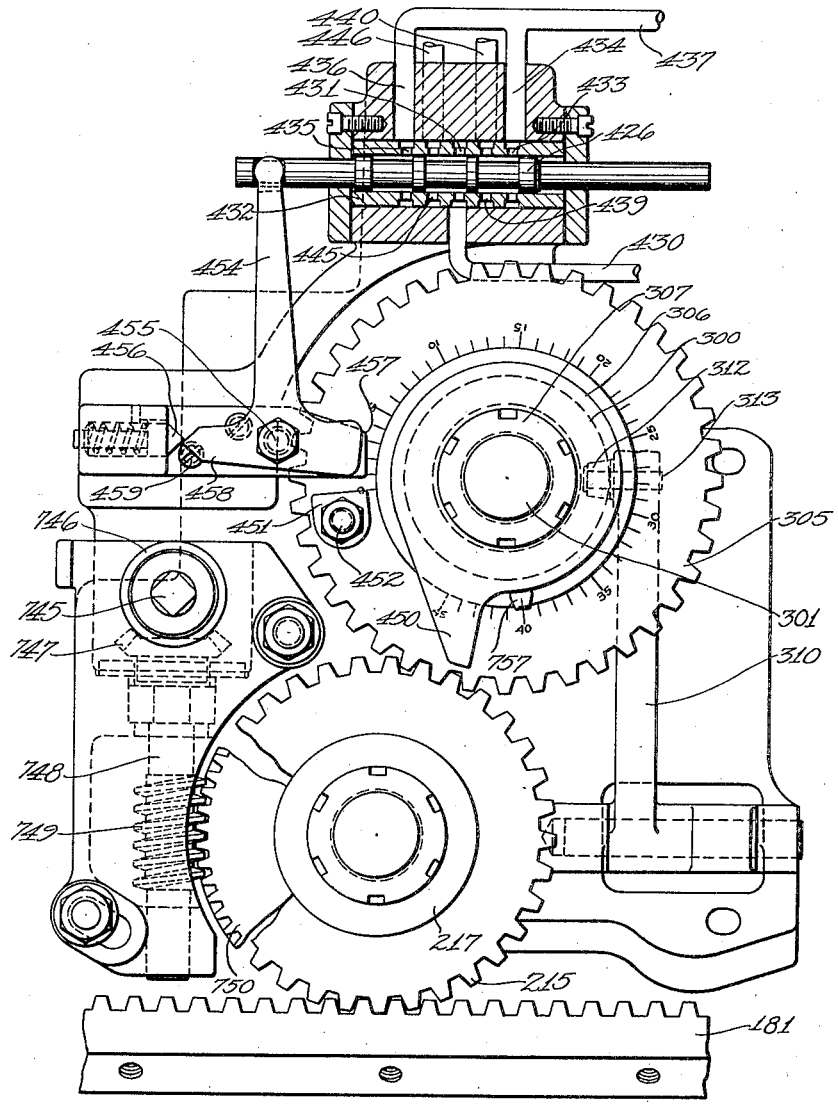
Fig. 15 is an elevational view of parts shown in Fig. 14 and illustrating the trip valve for the feed mechanism and the mechanism for reversing this valve.

The valve 426 is connected with one end of the feed reverse valve 425 through the ports 439 in the sleeve 432, the duct 440 and the ports 442 in the sleeve 443 (Figs. 15, 9 and 26). The feed reverse valve 425 slides in the sleeve 443. The feed pilot valve 426 is connected to the other end of the feed reverse valve 425 through the ports 445 in the sleeve 432, the duct 446, and the ports 447 in the sleeve 443. Thus it will be seen that as the pilot valve 426 is moved in opposite directions, the pressure fluid will be supplied alternately to opposite ends of the reverse valve 425 to shift this valve alternately in opposite directions.

The shifting of the feed pilot valve 426 is effected by movement of the roll piston 170. As the roll piston 170 reciprocates, it reciprocates the rack 181 (Figs. 12, 14, 15 and 26) and this in turn oscillates the gears 215 and 305 and the clutch-plate 306 which is secured to the gear 305. There is a stop lug 450 formed integral with the clutch-plate and there is a second stop 451 secured to the gear 305 by a bolt 452. As the gear 305 rotates in opposite directions, then, one or the other of these stops engages the short arm of a lever 454 to shift this lever in opposite directions. The long arm of this lever is furcated and engages the stem of the valve 426 so that as the lever is shifted, the valve is shifted also.

The lever 454 is pivotally mounted on a pin 455 which is threaded into a stop-block 457. This stop-block is secured to the base of the machine by screws 459. A spring load-and-fire mechanism is employed to shift the lever 454 sharply on reversal. This load-and-fire mechanism is of known construction and comprises a spring-pressed plunger 456 that is housed in the block 457 and has a V-shaped end and that engages the V-shaped end of a lug 458 which is integral with the lever arm 454.

The stops 450 and 451 engage the block 457 to limit the movements of the piston 170 (Figs. 12 and 26) in opposite directions. By releasing the nut 307 and disengaging the clutch member 306, the stop 450 can be adjusted angularly any desired distance from the stop 451 and so the amount of the roll between reversals and the points of reversal of the pilot valve 426 can be determined.

Fluid under pressure is supplied to the feed reversal valve 425 (Figs. 9 and 26) through ports 461 in the sleeve 443 and through a duct 460 which is connected with the ducts 430 and 405 (Figs. 9, 8 and 26). The motive fluid is exhausted from the valve 425 either through ports 462 in the sleeve 443 and the duct 463 (Figs. 9 and 26) which leads back to the sump of the machine or through the ports 464 in the sleeve 443 and the duct 465. This duct leads to the feed throttle-valve as will be described hereinafter. The valve 425 is connected with one end of the feed cylinder 351 through the ports 466 in the sleeve 443 and the duct 467 (Figs. 9, 5 and 26). The feed reverse valve 425 is connected with the opposite end of the feed cylinder 351 through the ports 468 in the sleeve 443 and the duct 469.

The rate of the feed of the gear into the cutter is governed by the feed throttle-valve 475 (Figs. 9 and 26). This valve is mounted for sliding adjustment upon a valve-stem 476. The valve is held against one face of a knurled nipple 477 (Figs. 9 and 8), which threads onto the stem 476, by a coil-spring 478. The coil-spring surrounds the stem 476 and is interposed between one face of the valve and the inside face of a cover-plate 479 that closes one end of the housing for the valves 475 and 425 and a third valve 485 which will be referred to hereinafter. The tension of the spring 478 can be adjusted by rotation of the nipple 477. A knurled lock-nut 481 is also threaded on the valve stem 476 to hold the nipple 477 in any adjusted position.

The valve 475 slides in a sleeve 482. The duct 465 (Figs. 9 and 26) which conducts exhaust liquid from the cylinder 351 (Fig. 5), when the duct 469 is on exhaust, communicates with the ports 483 provided in the sleeve 482. The sleeve 482 is provided with another set of ports 486 which communicate with a duct 487 that leads back to the sump of the machine. The valve 475 has a peripheral recess 488 which is adapted to connect the ports 483 of the sleeve 482 with the ports 486 of this sleeve.

It is desirable to have the feed movement take place at a varying rate. While the blank is being moved from withdrawn position up into contact with the cutter, the feed should progress at a rapid rate in order to reduce the idle time of the machine as much as possible. When the blank is actually in engagement with the cutter, the rate of feed must be reduced in order not to put too much of a burden on the cutter and as the blank feeds further and further into the cutter, the rate of feed should be correspondingly reduced because the greater the depth of the cutter in the blank, the heavier the burden which is placed on it. The rate of feed is controlled in the present machine by movement of the feed throttle-valve 475.

The end of the valve stem 476 opposite to that on which the knurled nipple 477 is threaded, is extended through an opening in the cover-plate 479 and is connected to a bell-crank 490. The valve-stem is recessed on opposite sides and the bell-crank is provided with furcations which straddle and fit into these recesses. The bell-crank is pivoted on a pin 491 in the column 40 and the short arm of the bell-crank carries a roller 492. This roller is adapted to ride on a cam-plate 493. This cam-plate is mounted in a longitudinal recess 494 in the feed stop-bar 375 and is adjustable therein.

The cam-plate 493 has a beveled front edge 495 which operates through the bell-crank 490 to vary the rate of feed.

Fig. 9 shows the positions of the parts when the blank is at full depth position. When withdrawal takes place, the stop bar 375 will move to the right from the position shown in Fig. 9 and the roller 492 will ride over the cam plate 493 dropping off of the upper face 496 of this cam plate on to the beveled portion 495 thereof, and thence down onto the bottom of the groove 494 in the stop-bar 375. During the withdrawal movement of the work head, the right-hand end of the cylinder 351 (Fig. 5) is open fully to exhaust through the duct 467 and duct 463 and hence during this movement the throttle-valve 475 is not operative.

At the end of the withdrawal movement, however, the roller 492 will be resting on the bottom of the groove 494 in the stop-bar 375 and so the throttle-valve 475 will be fully open. After the gear has been indexed and the return roll completed, the new feed movement will begin. This will start at high speed because the feed throttle valve is, as just mentioned, full open. It will continue at high speed as long as the roller 492 rolls along the bottom of the groove 494. When the blank is again about to engage the cutter, however, the roller 492 will begin to ride on the beveled surface 495 of the cam-plate 493. This will immediately rock the bell-crank lever 490 about its pivot 491 to shift the valve 475 and reduce the area of the opening of the ports 483 in the sleeve 482, thereby reducing the rate of feed. As the blank feeds further and further into the cutter, the roller 492 will ride further and further up the beveled face 495 of the cam-plate 493, thereby further and further reducing the rate of feed. Toward the end of the feed movement, the roller will have ridden up onto the top surface 496 of the cam-plate 493 thereby reducing the feed rate to a minimum. Thereafter, for the remainder of the feed movement, the feed will continue at this minimum.

The cam-plate 493 is adjusted in the groove 494 by rotation of the stud 497 which threads into the stop-bar 375. This stud is rotatably mounted in an ear 498 formed integral with the cam-plate 493. The stud is held against axial movement in this ear by a flange 499, which is integral with the stud and which seats against one face of the ear 498, and by the nut 499' which threads onto the stud 497 and seats against the opposite face of the ear 498.

From the preceding description it will be seen that the bell-crank 490 has a back and forth swinging movement that occurs once for each tooth space cut in the blank and that in one direction, this movement operates the throttle valve 475. This movement is utilized, however, for a still further purpose. It is employed to operate the automatic stop mechanism which functions to stop the machine when all of the tooth spaces of the gear have been cut.

The automatic stop mechanism is denoted at 500 in the drawings. It may be of any suitable construction. Preferably a stop mechanism is employed such as described in the U. S. patent to Hill, No. 1,577,121 of March 16, 1926.

The plunger of this stop-mechanism is denoted at 501. Every time the work is fed into the cutter, the plunger is pushed in and every time that the work is withdrawn from the cutter, this plunger is released. The automatic stop-mechanism is adjustable so that on the last feed movement, it trips the stop 385 (Fig. 8) out of the way to allow full withdrawal of the work head to loading position, as will now be described. At the end of the last withdrawal movement, after the last tooth space of the blank has been cut, the automatic stop mechanism functions to stop the machine.

As has been described above, the withdrawal movement of the work head for indexing is limited by the stop-member 385 through engagement of this stop-member with the lug 393 (Fig. 16) formed on the column 40. To withdraw the work head to loading position, then, it is necessary to retract the stop-member 385 from operative position. This is done by the automatic stop mechanism 500 on the final feed movement, as above mentioned.

There is a lever 504 (Fig. 8) which forms part of the automatic stop mechanism. In adapting the automatic stop mechanism for use on the present machine, this lever is connected by a link member 505 with a lever 506. This lever is pivotally mounted on the pin 491 already referred to and it is connected by a link 507 with a bell-crank lever 508. The connection between the link 507 and the bell-crank lever 508 is a pin and slot connection to allow free movement of the connected parts without binding. The bell-crank lever 508 is pivotally mounted upon a pin 509 that is secured in the column 40. The free end of the bell-crank lever carries a roller 510 that engages under a projection 512 formed on the stop-member 385.

When the lever 504 of the automatic stop mechanism is rocked about its pivot 514 on the last feed movement of the work head, it will rock the lever 506 about its pivot 491 through operation of the link 505. The movement of the lever 506 will rock the bell-crank lever 508 about its pivot 509 through operation of the link 507. Thus, the stop-member 385 will be raised upwardly against the resistance of the spring plunger 390 (Fig. 16) and the projection 401 on the stop member 385 will be moved out of operating position. On the following withdrawal movement of the work head, then, the lug 401 will be out of operating position and will not engage with either the lug 393 on the column 40 (Fig. 16) or the projection 402 on the lever 403. Thus the work head will be able to move freely away from the cutter until the work has been withdrawn far enough from the cutter to permit removal of the completed gear. This withdrawal movement is limited by engagement of the stop 515 (Fig. 9) with the stop 516. The stop 515 is secured to the bar 375 by the screw 517 and the stop 516 is secured to the column 40 by the bolt 518.

In this final withdrawal movement of the work head, there will be no shifting of the roll pilot valve 396 (Fig. 8) for the lug 401 of the stop-member 485 will be out of registry with the lug 402 of the lever 403. During this last withdrawal movement, therefore, there will be no reversal of the roll reverse valve 266 (Fig. 12) and hence, the cradle will be held in returned position. The machine will stop with the work head fully withdrawn to loading position, then, and with the cradle at the bottom of the return roll.

Now the automatic stop-mechanism of the Hill patent is adapted to re-set itself automatically after tripping. Hence, the lever 504 of the stop mechanism will return to the position shown in Fig. 8 immediately after functioning and will not retain the stop-member 385 in retracted position. Some means must be provided, therefore, to hold the stop-member 385 in retracted position, after it is raised to that position, for, as above indicated, the stop member 385 is moved to inoperative position during the last feed movement and it must be held in that position throughout the remaining part of the feed movement, during the whole of the last generating roll, and at least until after the stop-member 385 has been moved past the lugs 402 and 393 (Fig. 16) in the final withdrawal movement of the work-head to loading position. The means for holding the stop-member 385 in retracted position, once it has been moved to that position by the automatic stop mechanism will now be described.

Figure 17:
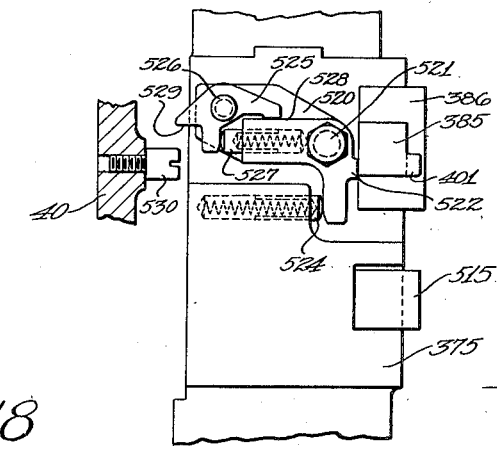
Fig. 17 is a view taken at right angles to Fig. 16 and showing in further detail the mechanism for locking the movable stop for the feed mechanism out of operative position when the work on the gear has been completed, thereby permitting the work to be withdrawn automatically to loading position.

Pivotally mounted on the under-face of the feed stop bar 375 is a bell-crank member 520 (Figs. 16 and 17). This member pivots on a stud 521 which is threaded into the feed stop-bar 375. One arm of the bell-crank member 520 is formed with a lug 522 which is adapted to engage under the stop-member 385, when this stop-member is raised to inoperative position, as above described. There is a spring pressed plunger 524 housed in the stop-bar 375, which engages this arm of the bell-crank member 520 to constantly urge the lug 522 into operative position. Ordinarily, however, the lug 522 simply engages against the back face of the stop member 385 and it is not until the stop-member is raised by functioning of the automatic stop mechanism that the spring plunger 524 can force the lug 522 under the stop-member 385.

There is a dog 525 pivotally secured to the other arm of the bell-crank 520 by a pin 526. A spring pressed plunger 527 which is housed in a boss 528 formed on the bell-crank 520, engages one arm of the dog 525. This arm of the dog 525 is formed with a bit 529.

When the stop-member 385 is retracted from operative position by the automatic stop mechanism, the plunger 524 swings the bell-crank member 520 about its pivot 521, forcing the lug 522 under the stop-member 385 and holding the stop-member in retracted position. On the ensuing withdrawal movement of the work head, the work head is withdrawn to loading position, because the stop-member 385 is out of operative position. During this withdrawal movement, the bit 529 of the dog 525 engages a stud 530 which is threaded into the column 40. Since the dog 525 is held against the boss 528 of the bell-crank 520, the bell-crank 520 will itself be rocked around its pivot pin 521 to move the lug 522 out of operative position and allow the stop-member 385 to be returned to operative position under actuation of the spring pressed plunger 390.

In the return movement of the work head to operative position, after the completed gear has been taken off the machine and a new blank chucked and the machine restarted, the stop 385 will pass over the lug 393 because the lower face of the stop is beveled as shown clearly in Fig. 8. In this return movement, the bit 529 of the dog 525 will engage the stud 530 but the dog will simply be rocked idly about its pivot 526, the spring 527 being compressed.

Any suitable mechanism may be employed for securing the gear blank, which is to be cut, in the work spindle. A preferred form of chucking mechanism is shown, however, in the drawings. This chucking mechanism comprises a collet-member 535 (Fig. 6) which is adapted to engage the stem 536 of the pinion P to be cut.

This collet-member is adapted to operate with a contractor-member 537 that is threaded into the arbor 121 and that has a conical internal surface which is adapted to cooperate with the conical outside surface of the fingers of the collet 535 to contract the collet when the collet is drawn rearwardly in the work spindle.

The collet-member is secured to a draw-bar 538 which is held against rotational movement in the work spindle by a key 539. The draw-bar is constantly urged into chucking position by a coil spring 540 which surrounds the draw-bar and is interposed between a washer 541 and a shoulder 542 formed to project into the bore of the work spindle. The washer 541 is held in position by a nut 543 which threads onto the draw-bar.

The draw-bar is moved forward against resistance of the spring 540 to release the collet upon movement of a sleeve-member 545. This sleeve-member engages the inner end of the draw-bar.

The releasing movement of the sleeve 545 and draw-bar 538 is effected by movement of a piston 547 which reciprocates in a cylinder 548 formed in the work head. The rear end of this cylinder 548 is closed by a cover-plate 549 which is secured to the work head by screws 550. There is a piston-rod 52 secured to the piston 547 by a nut 553. This piston-rod extends rearwardly through an opening in the cover-plate 549 and it contacts with a hardened tip 554 which has a pressed fit into one end of a lever 556.

The lever 556 is pivoted on a pin 557 that is secured in the cover-plate 558 of the index housing 124. This cover-plate 558 is secured in position by screws 559. The lever 556 is furcated to straddle a stripper-rod 560 and there are hardened contact tips 561 inserted in the furcations of the lever 556 which engage the rear end face of the sleeve 545.

The position of the piston 547 is controlled by the valve 485 (Figs. 9 and 26). Pressure fluid is admitted to this valve from the duct 460 through the radial ports 565 in the sleeve 566. The valve 485 reciprocates in this sleeve. The motive fluid is exhausted from the valve 485 either through the radial ports 567 in the sleeve 566 and the duct 463, or through the radial ports 569 in the sleeve 566 and the duct 570 which leads into the duct 463. The valve 485 is connected to the cylinder 548 by the ports 572 in the sleeve 566 and the duct 573 which connects these ports with the cylinder 548.

The valve 485 may be shifted manually by a hand-lever 575 (Fig. 1) which is secured to a shaft 576 (Fig. 9) that is rotatably mounted in the column 40. This shaft 576 has a furcated arm 577 secured to it and the furcated ends of this arm are slotted to engage pins 578 that extend from either side of the stem of the valve 485. Thus, by rocking the hand lever 575, the valve 485 can be shifted.

In the positions shown in the drawings, the cylinder 548 (Fig. 6) is on exhaust through the duct 573, the ports 572 and 569 of the sleeve 566 (Fig. 9) and the ducts 570 and 463. The chucking mechanism is, therefore, operative. When the valve 485 is shifted to the right from the position shown in Fig. 9, then the line 573 is put on supply from the duct 460 through the ports 565 and 572. This forces the piston 547 to the right from the position shown in Fig. 6 which moves the lever 556 about its pivot 557 and forces the sleeve 545 and draw-bar 538 to the left from the position shown in Fig. 6, compressing the spring 540 and moving the collet 535 to released position.

The chuck valve 485 is manually shiftable in the direction which places the cylinder 548 on exhaust and renders the chucking mechanism operative. It may, however, be operated automatically in the opposite direction, as shown in the drawings. The automatic shifting of the valve 485 to dechucking position takes place during the final withdrawal movement of the work head, when the work head is being moved to loading position and the result achieved is that, when the work head reaches loading position, the work is dechucked.

For the automatic operation of the valve 485, there is an arm 580 secured to the shaft 576. This arm is furcated at its outer end and the furcations are slotted to engage pins 581 which extend from either side of a plunger 582. The plunger is mounted to slide in an opening provided in a guide lug 583 which is integral with the column 40, and in a nut 585 which threads through a lug 586 that is also integral with the column 40.

The plunger 582 is constantly urged downwardly by a coil-spring 587 which surrounds the plunger and is interposed between the nut 585 and a shoulder formed on the plunger. The plunger is held in upward position by a catch 590 that is secured by screws 591 to a lever 592.

The lever 592 is pivoted on a pin 593 secured in the column 40. The catch or keeper 590 is carried by one arm of the lever. A spring pressed plunger 594, which is housed in the column 40 and engages the other arm of the lever, serves to urge the keeper 590 to operative position and to hold the keeper in operative position.

There is a trip-dog 595 pivotally mounted at 596 on the lever 592. A spring pressed plunger 597, which is housed in a boss 598, engages one arm of the dog 595. The boss 598 is integral with the lever 592. The pressure of the plunger 597 serves to urge the dog 595 in one direction about its pivot and holds the other arm of the dog against one face of the boss 598.

There is a trip-block 600 secured to the feed stop-bar 375 by screws 601. When the stop-bar 375 moves to the right from the position shown in Fig. 9 in the movement of the work head to loading position, the plate 600 engages the trip-dog 595 and swings the lever 592 about its pivot 593, disengaging the catch 590 from the plunger 582. The spring 587 then acts to move the plunger 582 downwardly and when the plate 600 has passed to the right under the plunger, the plunger drops behind the plate, locking the plate in its right-hand position.

The downward movement of the plunger 582 under actuation of the spring 587 rotates the shaft 576 and causes the arm 577 to shift the valve 485 to the right from the position shown in Fig. 9. This puts the cylinder 548 (Fig. 6) on supply and causes the blank to be dechucked.

The movement of the plunger operates not only to trip the valve 485, but to lock the stop-bar 375 in its right-hand position, thus preventing return of the work head to operating position until a new gear blank has been chucked on the work spindle and the valve 485 shifted back to the left by manual operation of the lever 575 (Fig. 1). As a further safety device, a limit-switch 605 (Figs. 9 and 26) is mounted on the column 40. This switch is so mounted as to be operated by the stem of the valve 485. When the valve 485 is shifted to the right from the position shown in Fig. 9, the switch 605 is opened, opening the starting circuit to the electric motor 70 which drives the cutter. Hence, the cutter cannot be started until a gear blank has been chucked by moving the valve 485 manually back to the left.

In the return movement of the stop-bar 375 to the left from the position shown in Fig. 9, at the beginning of a new cutting operation, the dog 595 will be rocked upwardly by the plate 600 and will swing about its pivot 596, merely compressing the spring which operates the plunger 597. When the valve 485 is returned to the left, the plunger 582 is, of course, moved upwardly and the lever 592 returns to locking position under actuation of the spring plunger 594. When the workhead is in operative position, the plate 600 acts as a safety device, preventing dechucking of the work for the plate 600, in this position, prevents lowering of the plunger 582 and the work cannot be dechucked without lowering this plunger. Thus the plate 600 acts to prevent dechucking of the work when it is in cutting position.

In order to make it easy to remove the completed gear from the work spindle, a stripper mechanism is provided. This is operated manually after the gear has been dechucked and functions to disengage the stem of the gear from the collet and push it forwardly in the arbor far enough so that the operator can readily lift the gear off of the arbor.

The stripper mechanism comprises the rod 560, already mentioned. This rod is mounted to slide in aligned openings provided in the draw-bar 538, sleeve 545, and collet 535 (Fig. 6). The stripper rod is adapted to engage the rear end face of the stem 536 of the pinion being cut.

The stripper is adapted to be actuated by a lever 610 which is pivotally mounted on a pin 611 that is secured in the cover-plate 568. One arm of this lever carries a contact-tip 612 that engages the stripper-rod 560. The other arm of the lever carries a contact-tip 613 that engages a piston-rod 614. This piston-rod passes through an opening in a cover-plate 615 of a cylinder 616 and it is secured by a nut 617 to a piston 618. There is a coil-spring 620 mounted on the piston-rod 614 and interposed between a washer 621 and the cover-plate 615. This coil-spring serves to urge the piston 618 constantly to the left to the position shown in Fig. 6. This corresponds to the inoperative or withdrawn position of the stripper-rod 560. The stripper-rod is actuated by application of hydraulic pressure to the left-hand end of the piston 618.

Figure 10:
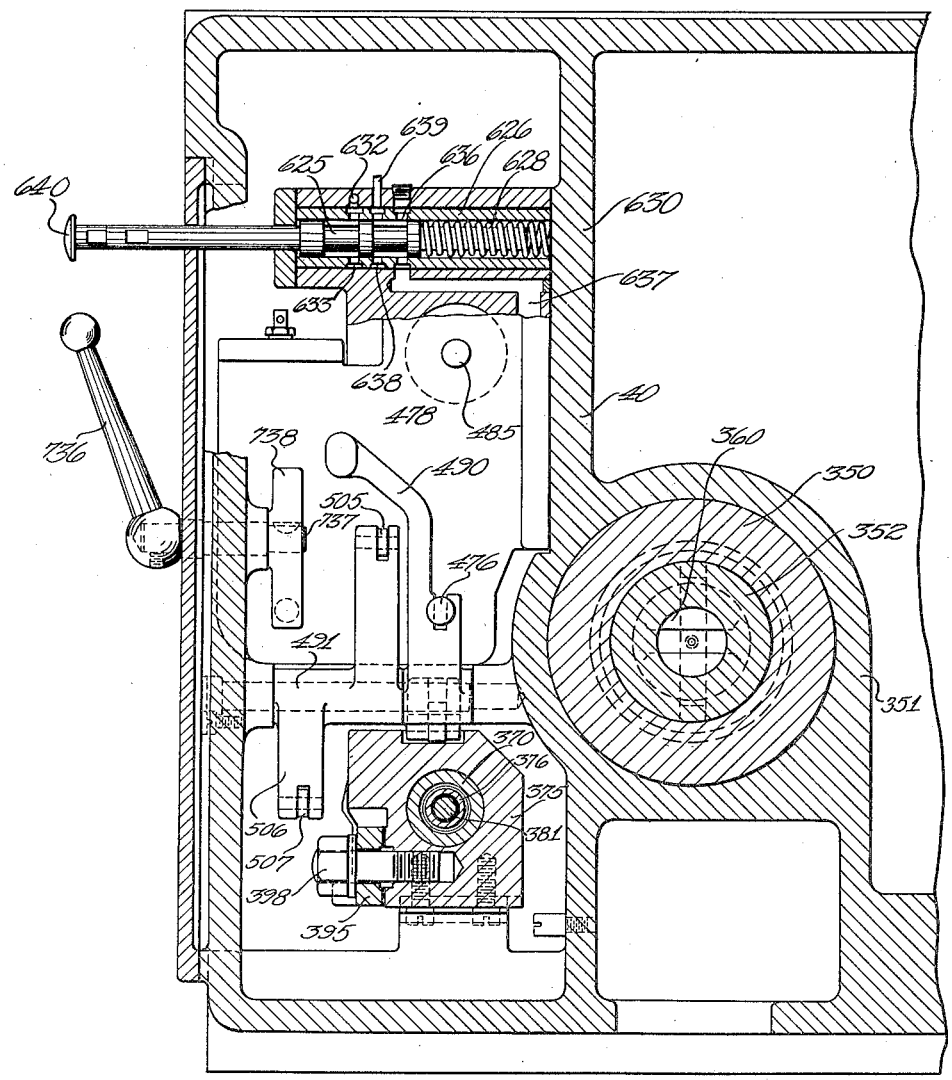
Fig. 10 is a fragmentary vertical sectional view taken at right angles to the views of Figs. 8 and 9.

The movement of the piston 618 is controlled by a valve 625 (Figs. 10 and 26). This valve is reciprocable in a sleeve 626 that is secured in the casting 478 which forms the valve-casing of the column 40. The stripper valve 625 is constantly urged outwardly by the coil-spring 628 and normally occupies the position shown in Fig. 10. The coil-spring 628 is interposed between a shoulder formed on the valve and the rib 630 of the column 40.

The pressure-fluid is supplied to the valve 625 from the duct 632 through the radial ports 633 in the valve-sleeve 626. The duct 632 (Fig. 9) is connected to a duct 634 which is in communication with the ports 565 of the sleeve 566 of the chuck valve 485 and these ports are in turn in communication with the supply duct 460. The motive fluid is exhausted from the valve 625 through ports 636 in the sleeve 626 and a duct 637 that leads back to the sump (Fig. 10). The valve 625 is connected with the left-hand end of the cylinder 616 (Fig. 6) through radial ports 638 in the sleeve 626 and the duct 639.

In the position shown, the left-hand end of the cylinder 616 is on exhaust through the line 639, the ports 638 and 636, and the duct 637. When the valve 635 is moved to the right, however, from the position shown in Fig. 10 by pushing in on the knob 640 of the valve stem, the left-hand end of the cylinder 616 is put on supply from the duct 632 through the ports 633 and 638 and the duct 639. This forces the piston 618 to the right from the position shown in Fig. 6 and actuates the stripper-rod 560.

In order to hold the work as rigidly as possible during cutting and thereby insure the greatest possible accuracy from the cutting operation, the present machine is provided with an outboard support for the work. This outboard support or tailstock is shown in Figs. 19, 20, 21 and 22.

This outboard support includes a plate or bracket 645 which is adjustable on the work head 50 in order to accommodate gears of different sizes. The bracket 645 is secured to the work head 50 by bolts 646 and 647. The bolts 646 pass through elongated slots 648 in the bracket 645 and thread into the work head. The bolts 647 are T-bolts and their heads engage in a T-slot 649 formed in the work head. The bracket 645 adjusts on the work head in a direction parallel to the axis of the work spindle.

There is an arm 650 pivotally mounted on the bracket 645. The arm is formed with trunnions, as indicated at 651 and 652, Fig. 19, which are received in suitable bearings formed in the bracket 645. The arm is formed with a half-cylindrical recess 653, as clearly shown in Fig. 21 and in this recess there is mounted a cylindrical bearing 657. A centering-pin 654 is rotatably and slidably mounted in this bearing.

The centering-pin is adapted to enter a recess 655 that is provided in each of the pinions to be cut and this centering-pin cooperates with the work arbor 121 to hold the work-piece. The bearing 657 is held in the recess 653 by a retaining-plate 656.

The centering-pin 654 is moved into and out of engagement with the work-piece, by a lever 658. This lever is pivoted on a bolt 659 which serves to secure the retaining-plate 656 to the arm 650. The lever is furcated at one end and the furcations of the lever engage in slots formed on opposite sides of the centering-pin. The opposite end of the lever is held in engagement with a piston-rod 660 by a spring-pressed plunger 661. The plunger is housed in the trunnion 651 of the arm 650 and the tension on the spring 662 of the plunger can be adjusted by a nut 663 which threads into this trunnion.

The piston-rod 660 is secured to a piston 665 by a nut 66. The piston 665 reciprocates in a cylinder 667 which is secured to the bracket 645 by screws 668. The piston-rod passes through the stuffing-box 669 and the retaining-plate 670 that close one end of the cylinder 667. The opposite end of the cylinder is closed by an end-plate 672. The plates 670 and 672 are secured in position by screws 673 and 674, respectively.

When the centering-pin 654 is withdrawn from engagement with the gear blank, the arm 650 may be swung out of the way into a recess provided therefor in the bracket 645 so as to permit the gear to be withdrawn from the work spindle. There is a latch, however, which holds the arm 650 in its outer position with the centering-pin in operating position and this latch 675 (Figs. 21 and 22) must be first disengaged before the arm 650 can be swung backwardly.

The latch 675 is in the form of an arm that, in operating position, engages behind a plate 677 which is secured by screws 678 to the arm 650. This plate 677 is adapted to abut against a plate 685 to limit outward movement of the arm 650. The plate 685 is secured to the bracket 645 by screws 686.

The latch arm 675 is keyed to a shaft 676 which is journaled in the bracket 645. There is a second arm 679 keyed to the shaft 676. A spring-pressed plunger 680 that is housed in the bracket 645 engages the outer end of the second arm 679 and operates through the shaft 676 to hold the arm 675 in locking position and to constantly urge the arm 675 to that position. The tension on the spring 681 which actuates the plunger 680 can be adjusted by rotation of a nut 682 which threads into the bracket 645.

Figure 19:
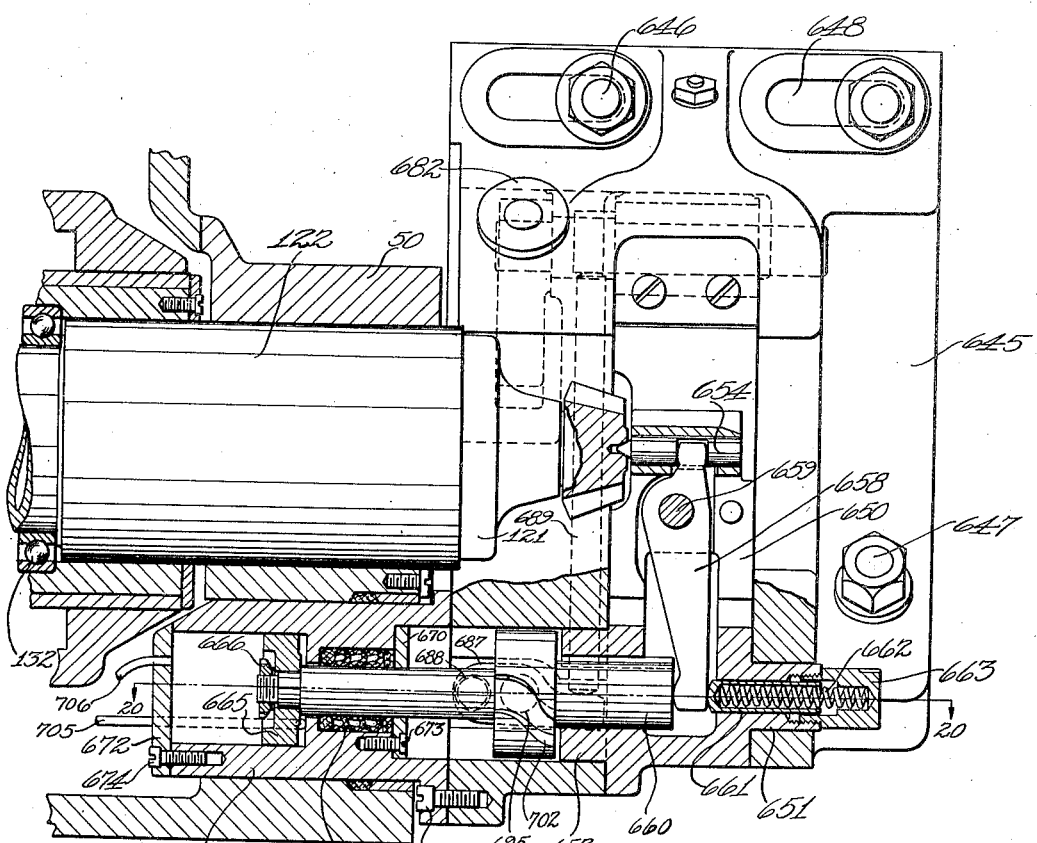
Fig. 19 is a view showing the movable center or tail-stock for the work and showing parts of the mechanism for operating the same.
Figure 20:
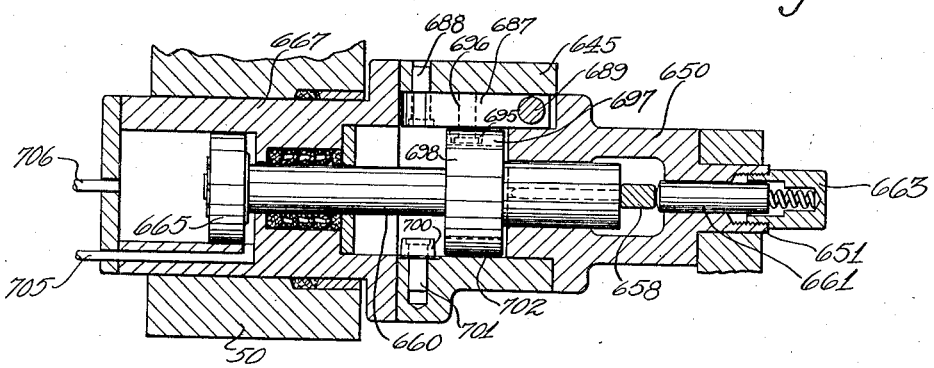
Fig. 20 is a section on the line 20—20 of Fig. 19.

The latch-member 675 is disengaged from latching position by swinging movement of an arm 687 (Figs. 19 and 20). This arm is pivotally mounted in the bracket 645 upon a pin 688 and its free end engages one end of a rod 689 that is longitudinally movable in a bore drilled in the bracket 645. The upper end of this rod 689 contacts with a lug 690 which is adjustably secured to the latch-arm 675 by a bolt 691 which passes through a longitudinal slot 692 formed in the latch-arm 675. Upward swinging movement of the arm 687 will push the rod 689 upwardly and disengage the catch 675.

The piston-rod 660 in its movement operates both the arm 687 and the arm 650. There is a roller 695 secured to the arm 687 by means of a pin 696. This roller engages in a cam-slot 697 which is formed in one side of a cylindrical enlargement 698 on the piston-rod 660. This cam-track 697 is so shaped as indicated in Fig. 19 that, as the piston 665 is moved to the left from the position shown in Figs. 19 and 20, the arm 687 will be swung upwardly to cause the rod 689 to disengage the latch-member 675.

The piston-rod 660 is keyed to the arm 650 so that any rotary movement imparted to the piston-rod will in turn be imparted to the arm 650. Now there is a roller 700 secured in the bracket 645 by a pin 701. This roller is adapted to engage in a cam-slot 702 formed in the cylindrical enlargement 698 of the piston-rod. This cam-track 702 is diametrically opposite the cam-track 697. Its shape is clearly shown in Fig. 19. The roller 700 is spaced axially of the piston-rod 660 at a sufficient distance from the roller 695 that, as the piston 665 moves to the left from the position shown in Figs. 19 and 20, the latch 675 will first be disengaged from the arm 650 then the arm 650 will be rocked on its trunnion to swing the arm 650 out of operative position. In the first portion of the movement of the piston 665 to the left, of course, the centering-pin 654 will be disengaged from the pinion for the lever 658 will be swung about its pivot 659 through action of the spring plunger 661.

The movements of the piston 665 are controlled by the same valve 485 which controls the chucking mechanism. One end of the cylinder 667 is connected with the valve 485 (Fig. 9) through a duct 705 which communicates with the duct 573 (Figs. 9 and 26) that leads to the valve 485. The opposite end of the cylinder 667 is connected to the valve 485 by a duct 706 which connects with a duct 707 in the valve-casing 578 (Figs. 9 and 26). The duct 707 leads into the radial ports 709 in the sleeve 566. In the position of the valve 485 shown in the drawings the center-pin 654 is in operative position. When the work head is moved to loading position and the plunger 682 (Fig. 9) drops down to shift the valve 485, as above described, then the work will not only be dechucked automatically, but the centering-pin 654 will also be moved out of operative position, the latch 675 will be disengaged from the arm 650 and the arm 650 swung back out of operative position automatically.

The running parts of the machine may be lubricated in any suitable manner and as the lubricating mechanism forms no part of the present invention, it has not been illustrated in detail. I have shown in Figs. 6 and 7, however, the details of an auxiliary lubricating system for the work spindle and the running parts of the work head. This auxiliary lubricating mechanism is in the form of a plunger pump comprising a plunger 710 which is held by the coil-spring 711 in engagement with the cam-shaped peripheral portion 712 of the flanged member 130.

The cam-portion 712 has an undulating peripheral surface as clearly shown in dotted lines in Fig. 7, so that as the flanged member 130 oscillates back and forth with the hypoid gear 135, it will impart rapid reciprocating movements to the plunger 710. As the plunger moves into the low spots of the cam 712, it opens the check-valve 714 by suction and draws the lubricating oil from the bottom of the chamber in the work head in which the hypoid gear 135 rotates through the duct 715 into the chamber of the plunger itself. Each time that the plunger 710 rides up on the risers of the cam 712 it forces open the check-valve 716 and pumps the oil, which was previously sucked into the plunger chamber, out of the plunger chamber through the ducts 717, 718 and 719 and through the check-valve 720 and duct 721 into the reservoir 722 in the trunnion 340. Thence the oil flows through ducts 723, 724 and 725 to the various parts of the work spindle and its drive.

One of the features of the present machine is its rigidity. The cutter can take a very heavy cut without chatter. The rigidity of the machine is due not only to its sturdy construction, but also to the use of an overhead-tie for connecting the tool end of the machine to the work end of the machine. Such a tie can be employed advantageously because the feed movement is a swinging movement and not a straight-line movement.

Figure 3:
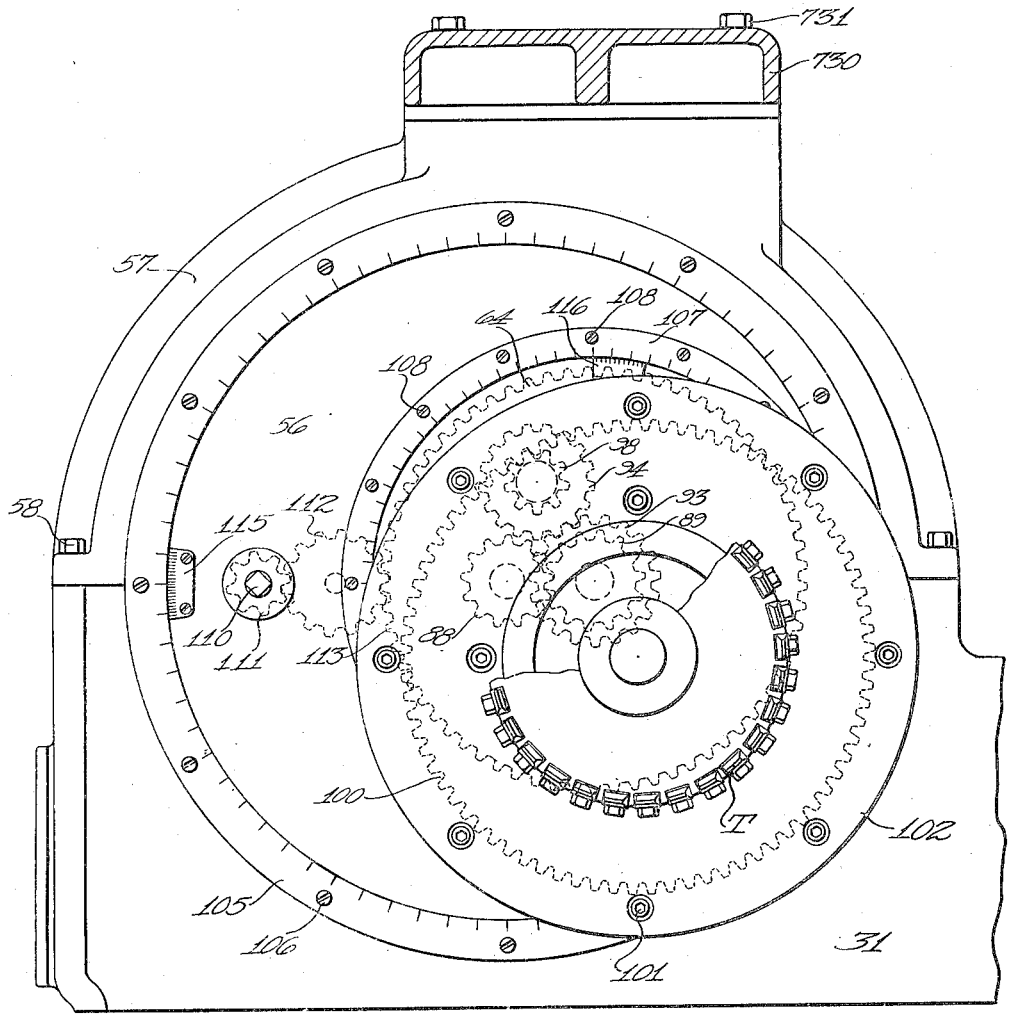
Fig. 3 is a fragmentary transverse sectional view through the machine, looking at the cutter end of the machine.

The overhead-tie employed is designated 730 in the drawings (Figs. 1, 2 and 3). This tie is in one piece. It is fastened rigidly at one end to cap-member 57 of the tool column 31 by bolts 731 and it is adjustably secured at its other end to the column 40 by bolts 732. The bolts 732 are T-bolts and they pass through elongated slots 733 provided in the tie and their heads engage in a T-slot formed in the upper face of the column 40. The longitudinal slots 733 are parallel to the ways 32 of the base of the machine and the T-slot 734, which extends at right angles to the slots 733 is parallel to the ways 38 of the plate 34. Thus, the slots 733 and 734 permit both longitudinal and transverse adjustment of the work head 50 and column 40 on the machine.

Conveniently located operating handles are provided for manual operation of the different control valves. The handles 575 and 640 (Fig. 1) for the chuck valve 485 and stripper valve 625, respectively, have already been described. In addition, there is a handle 735 (Fig. 1) provided for moving the stop 385 (Fig. 8) out of operating position when it is desired to withdraw the work head to loading position. There is also a handle 736 (Fig. 1) provided for shifting the roll pilot valve 396 (Fig. 8) so as to return the cradle.

The handle 735 is secured to the shaft 509 to which the bell-crank lever 508 is secured. The handle 736 (Figs. 8 and 10) is secured to a shaft 737 that is journaled in the column 40. There is a lever 738 keyed to this shaft. A spring-pressed plunger 739 that is housed in the column 40 engages one end of this lever. The other end of the lever is adapted normally to rest against a stop 740 formed on the column. When the handle 736 is rocked in a clockwise direction, however, the latter end of the lever engages the stem of the valve 396 to shift this valve.

*Use and operation of the machine*

To use the machine, the several adjustments of the tool and work are first made. To set the work head to the correct root angle setting to correspond to the root angle of the gear to be cut, the lock-nut 380 (Fig. 5) is loosened by rotating the rod 381 and then the sleeve-member 376 is rotated to adjust the stop-rod 370 in the feed stop-bar 375. This swings the work head 50 about the axis of its trunnions 340 and 341 (Fig. 7). There is a pointer 741 (Fig. 1) secured to the work head and this reads against graduations on the wing 42 of the column 40 (Figs. 1 and 8) so that the root angle adjustment of the work head can be made very accurately.

The cone-distance adjustment of the work is made by adjusting the plate 34 longitudinally on the base 30 and by adjusting the column 40 transversely on the plate 34 (Figs. 1 and 2). The former adjustment is made by rotation of the screw-shaft 35 and the latter adjustment is made by rotation of the screw-shaft 44. After adjustment of the plate 34 on the base 30 has been made, the plate is again secured to the base by tightening up the bolts 36 and after the adjustment of the column 40 on the plate 34 has been made, the column 40 is again secured to the base 34 by tightening up the bolts 45 and 46. During the making of these two adjustments, the bolts 732, which secure the overhead-tie 730 to the column 40, are, of course, loosened, but after these adjustments have been made, the overhead tie is again secured to the column 40 by tightening up these bolts 732. There is a pointer 742 secured to the plate 34 which reads against a graduated scale that is secured to the base 40 (Fig. 1) and this enables the adjustment of the plate 34 on the base 30 to be made very accurately. A similar pointer and scale (not shown) may be provided to insure accurate transverse adjustment of the column 40 on the plate 34.

The adjustment of the cutter to cut teeth of the required spiral angle on the gear is made by first rotating the shaft 110 (Figs. 3 and 4) to adjust the axis of the cutter spindle to the correct radial distance from the axis of the cradle and by then rotating the shaft 745 (Fig. 15) to adjust the cradle 56 angularly in the column 31 and bring the cutter into operative relation with the work. Rotation of the shaft 110 rotates the gears 111, 112 and 113 and causes the carrier 64 to be adjusted angularly in the cradle 56. This changes the radial setting of the cutter, as described, due to the eccentric mounting of the carrier 64 in the cradle. This adjustment can be made very accurately through the use of the vernier 116 and the graduations on the retaining-ring 107 (Fig. 3). After the adjustment is made, the carrier is clamped in position by tightening up on the screws 108. To adjust the cradle angularly, the clutch-member 217 (Figs. 14 and 15) must first be disengaged by loosening the nut 218. Then the shaft 745 is rotated and this rotates the bevel gear 746 which is carried by this shaft. This gear drives the bevel gear 747 which is mounted on a worm-shaft 748. The worm 749 formed on this shaft meshes with the worm-wheel 750 which is keyed to the shaft 216. This shaft carries the bevel pinion 222 which meshes with the bevel gear 224 (Figs. 14 and 4) that is secured to the cradle. This adjustment can be made very accurately by use of the vernier 115 (Fig. 3) which reads against the graduations provided on the retaining-ring 105. After the adjustment has been made, the clutch 217 is engaged again with the gear 215 so that the reciprocating movement of the rack 181 will be transmitted to the cradle.

The depth of cut, that is, the depth of the tooth spaces cut into the blank, is determined by the setting of the stop-plate 395 (Fig. 8). This is adjustable on the feed stop-bar 375 and it carries a pointer 755 which reads against graduations on the stop-bar. The stop-plate 395 is secured in position after adjustment by tightening up the bolt 398.

The rate of the feed movement is determined by the setting of the throttle-valve 475 (Figs. 9 and 26). This valve is adjusted by rotation of the graduated dial-member 477 (Figs. 8 and 9) which threads onto the stem 476 of the valve.

The point at which the fast feed movement ends and the slow feed movement for cutting begins is determined by adjustment of the cam-plate 493 (Fig. 9) and this plate is adjusted by rotation of the bolt 497.

The extent of the rolling movement of the work spindle and cradle is determined by the setting of the adjustable stop 450 carried by the clutch-plate 306 (Figs. 15 and 14). The angular distance that this adjustable stop is set away from the fixed stop 451 carried by the gear 305 determines the extent of the rolling movement. The stop 450 is adjusted by releasing the clutch-member 306 and rotating the clutch-member on the shaft 301. There is a pointer 757 (Fig. 15) carried by the clutch-plate 306 and this pointer reads against graduations on the gear 305 so that the stop 450 can be adjusted accurately. After adjustment of the stop, the clutch-member 306 is engaged again with the gear 305 by threading up on the nut 301.

The point at which the substantially uniform rate of roll is changed to a varying rate of roll is determined by the adjustment of the set-screw 319 (Figs. 18 and 14).

The rate of variation of the generating roll is determined by adjustment of the fulcrum for the lever 316 (Fig. 14). This lever is connected at 317 to the stem of the roll throttle-valve 260. The fulcrum-block 320 is secured in position after adjustment by tightening up on the T-bolt 322.

The ratio of roll change gears 190, 195, 198 and 199 (Figs. 13 and 27) and the index-plate 126 (Fig. 11) are selected, of course, in accordance with the gear to be cut. The automatic stop mechanism 599 (Figs. 8 and 9) is adjusted in accordance with the number of teeth in the gear to be cut.

Having made all of the necessary adjustments of the machine, the cutter T may be secured to the cutter spindle and the gear blank to be cut may be chucked in the work spindle. Assuming that the pinion P is to be cut, the stem 536 of this pinion is inserted in the arbor 121 and then the chuck-valve 485 is moved manually by rotation of the hand-lever 575 (Fig. 1) so that the cylinder 548 (Fig. 6) is put on exhaust through the duct 573 (Figs. 6, 9 and 26), the ports 572 and 569 of the sleeve 566 and the ducts 570 and 463. This allows the spring 540 to force the draw-bar 538 rearwardly in the work spindle 120 to cause the collet 535 to grip the stem 536 of the pinion P.

The described manual movement of the valve 485 to the left to the position shown in Fig. 9 releases the limit switch 605 and allows the cutter drive motor 70 to be started.

The machine stops with the work head in withdrawn position and the cradle at the end of the generating roll. When the machine is started, by pushing in the starter button (not shown) of the motor which operates the pump that supplies pressure fluid to the hydraulically operated parts of the machine, the first movement that takes place is an idle return roll of the cradle. At the end of the return roll, the feed reverse valve is tripped and the work is fed into the cutter.

The parts are shown in the drawings in the positions which they occupy at the end of the feed movement. The stop-plate 395 (Figs. 8 and 26) has just thrown over the lever 403 to the position shown in Figs. 8 and 26 and the roll pilot-valve 306 has just been shifted to the position shown and the shifting of this valve has just moved the roll reverse valve 266 (Figs. 12 and 26) to the position shown in Figs. 12 and 26. The cycle of operation of the machine will be described starting with this point.

The pressure fluid is being pumped from the pump through the line 268, the ports 269 and 286 of the sleeve 270 and the duct 285 into the right-hand end of the cylinder 171. At this same time, the motive fluid is being exhausted from the other end of this cylinder through the duct 265, ports 287 and 288 of the sleeve 270, ducts 271 and 279 (Figs. 12, 14 and 26), ports 277 and 278 of the roll throttle-valve 260 and ducts 281 and 272 back to the sump of the machine. Thus, the piston 170 will be forced to the left from the position shown in Fig. 12. This moves the racks 180 and 181 to the left. The rack 181 drives the cradle 56 through the gearing 215, 222 and 224 (Figs. 14, 4 and 27). The rack 180 simultaneously imparts rotary movement to the work spindle through the gearing 190, 195, 198, 199, 202, 205, 210 and 135, the index lock-up dog 144 and the index-plate 126 (Figs. 27, 13, 7, 6 and 11).

The combined rotary motions of the cradle and of the work spindle effect the generation of correct tooth profiles on the tooth spaces being cut. The rate of the generating roll, during the uniform portion of the roll, is controlled by the setting of the roll throttle-valve 260 and, during the variable portion of the roll, the cam 300 which operates through the bell-crank lever 310 and the lever 316 (Figs. 14 and 26) to shift this throttle valve. The cam 300 is rotated continuously throughout the generating roll, being driven from the rack 181 through the gearing 215 and 305.

As the gear 135 rotates driving the work spindle, as described, it carries with it the paddle-member 245 (Fig. 7) which is keyed to the sleeve 230 which in turn is keyed to the hub 131 (Fig. 6) of the flanged-member 130 to which the hypoid gear 135 is secured. The paddle-member 245 moves in a clockwise direction and hence the oil in the drum 231 is entrapped between the paddle 245 and the partition-wall 237 of the drum. Since the only way in which this entrapped oil can escape is through the ducts 256 and 255 and the duct 255 leads to the duct 265 which is connected through the ports 287 and 288 (Figs. 12 and 26), and the duct 271 with the throttle-valve 260, it follows that a load or braking effect is imparted to the train of gearing driving the work spindle and so the back-lash in this train is constantly taken up during the cut.

The roll proceeds at a substantially uniform rate during the first part of the roll and then the rate of roll is increased by movement of the throttle-valve 260 through operation of the cam 300 (Figs. 14 and 26), as above described.

The generating roll continues until the adjustable stop 450 strikes the block 457 (Figs. 15 and 26). At the moment that this stop strikes the block 457 or an instant before, the stop also strikes the short arm of the ball-crank lever 454. This rocks the lever 454 about its pivot 455 and the lever is thrown over sharply by the load and fire mechanism 456 to shift the feed pilot valve 426 over to the right from the position shown in Fig. 15. This valve shifts the feed reverse valve 425 (Figs. 9 and 26), for, when the valve 426 is shifted, the pressure fluid flowing through this valve from the line 430 will pass through the ports 431 and 439 in the sleeve 432, the duct 440 and the ports 442 into the left-hand end of the sleeve 443 and so the valve 425 will be forced to the right from the position shown in Fig. 9. As the valve moves to the right, the motive fluid in the right-hand end of the sleeve 443 exhausts through the ports 447, duct 446, ports 445 and 435 and the duct 437 back to the sump of the machine.

Now when the feed reverse valve 425 is moved over to the right, the pressure fluid is applied to the left-hand end of the piston 350 (Figs. 5 and 26) for, at this time, the pressure fluid will flow from the duct 460 (Figs. 9 and 26) through the ports 461 and 468 and the duct 469 to the left-hand end of the feed cylinder 351 (Figs. 5 and 26). At this time, the motive fluid in the right-hand end of the cylinder 351 will exhaust from the cylinder through the duct 467, the ports 466 and 462 and the duct 463 back to the sump. Thus, the piston 350 will move to the right in the cylinder 351 (Figs. 5 and 26) and the work head will be withdrawn from operative position. The work head will be withdrawn at full speed because the exhaust from the right-hand end of the cylinder 351 has an open-line to the sump and there is no throttling action on this line.

The withdrawal movement continues until the stop-member 385 (Figs. 8 and 26) strikes the lug 393 (Fig. 16). The gear blank will then be clear of the cutter so that it may be indexed on the ensuing return roll of the cradle. Just before the stop-member 385 strikes the projection 393 or at the moment that it strikes this projection, it will also strike the projection 492 on the lever 403 (Figs. 16 and 8). This will rock the lever 402 about its pivot 495 and shift the roll pilot valve 396 over to the left from the position shown in Figs. 8 and 26.

The shifting of the pilot valve 396 will cause the roll reverse valve 266 (Figs. 12 and 26) to be shifted to the left from the position shown in Figs. 12 and 26. This occurs because, when the roll pilot valve 396 is shifted to the left, the pressure fluid flowing to this valve through the duct 405 will flow through the ports 406 and 418 and the duct 419 (Figs. 8, 12 and 26) into the right-hand end of the sleeve 270. At the same time, the motive fluid will exhaust from the left-hand end of this sleeve through the ports 416, duct 415, ports 414 and 409 and duct 410 back to the sump.

When the roll reverse valve 266 is moved to the left, as described, the pressure fluid flowing from the line 268 will pass through the ports 269 and 287 and the duct 265 into the left-hand end of the cylinder 171. The right-hand end of this cylinder will then be on exhaust through the duct 285, ports 286 and 274 and duct 272 back to the sump. This will cause the piston 170 to move to the right from the position shown in Fig. 12 and will produce the return roll of the cradle and of the work.

While the pressure fluid is being supplied to the left-hand end of the cylinder 171, as just described, it is also being supplied to the brake-drum 231 (Figs. 6 and 7) through the duct 255 which connects with the duct 265 and which leads into the brakedrum (Figs. 12, 7 and 26). Thus, the paddle 245 is forced away from the partition-wall 237 to move in a counter-clockwise direction. The gears which drive the hypoid gear 135 (Fig. 27) are now rotating in the opposite direction to their direction of rotation during the generating roll and the pressure applied to the paddle 245 will therefore tend to hold the teeth of each of these gears against the same sides of the teeth of their mating gears as those against which these teeth are held during the generating roll. In other words, the brake mechanism will operate to take up backlash in the same direction during both the generating and return rolls.

The return roll of the cradle and work will be at full speed for the roll throttle mechanism is not effective during the return roll.

Figure 11:
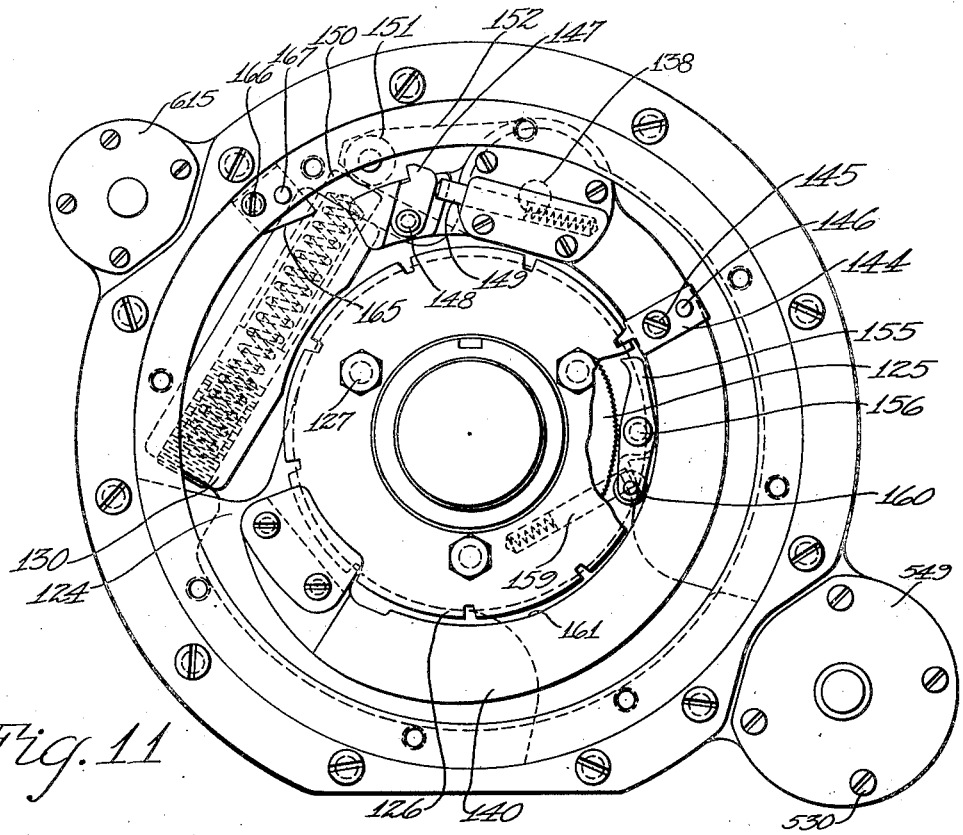
Fig. 11 is a view looking at the outer end of the work spindle and showing the indexing mechanism for the work spindle.

During the generating roll, the lever 140, lock dog 144 and the index-plate 126 will have moved in a counter-clockwise direction as viewed in Fig. 11, from the position shown in Fig. 11 and in this movement, the trip-dog 147 will have passed idly under the trip-lug 165, the spring-pressed plunger 149 being simply compressed. On the return roll, the lever 140 will move in the clockwise direction and as the trip-dog 147 passes under the trip-lug 165 in this direction, the lever 140 will be swung about its pivot 138. This will disengage the lock-dog 144 from the index-plate 126 and the pawl 155 will drop into engagement with the ratchet-wheel 125 to hold the ratchet-wheel and the work spindle stationary. The arm 140 continues to rotate, however, in the clockwise direction, being driven by the hypoid gear 135 to which it is connected. The lock-dog 144 travels on the periphery of the index-plate 126 until it registers with the next adjacent notch in the index-plate. Then it drops into this notch, causing the pawl 155 to be disengaged from the ratchet-wheel 125 and locking the work spindle again to the hypoid gear 135. Thus, during the return roll, indexing of the work will be effected. The position of the parts at the end of the indexing movement is shown in Fig. 11.

The return roll continues until the fixed stop 451 (Figs. 15 and 26) strikes the block 457. At the moment that this stop strikes this block, or an instant before, the stop strikes the short arm of the bell-crank lever 454. This shifts the feed pilot valve 426 back to the position shown in Figs. 15 and 26. This causes the pressure fluid to be again supplied to the feed reverse valve 425, from the line 430 (Figs. 15 and 26) through the ports 431 and 445 and the line 446. At the same time, the motive fluid exhausts from the valve 425 through the ports 442, the line 440, the ports 439 and 433 and the ducts 434 and 437 back to the sump. This causes the valve 425 to be shifted back to the position shown in Fig. 9.

The movement of the reverse valve 425 to the position shown in Fig. 9 puts the right-hand end of the cylinder 351 on supply (Figs. 5 and 26), the pressure fluid flowing from the line 460 through the ports 461 and 466, and the line 467 (Figs. 9, 5, and 26) to the right-hand end of this cylinder. At the same time, the motive fluid will be exhausting from the left-hand end of the cylinder 351 through the line 469, the ports 468 and 464, the duct 465, the ports 483 and 486 of the throttle-valve sleeve 482, and the line 487 back to the sump.

The work will, therefore, be fed back into the cutter to cut a new tooth space in the blank. The rate of this feed movement will be determined by the throttle-valve 475. At the beginning of this feed movement, the roller 492 (Figs. 9 and 26) will be resting on the bottom of the slot or groove 494 in the feed stop bar 375. The first part of the feed movement will proceed, therefore, at a very rapid rate because the throttle-valve 475 will be pushed fully over to the left from the position shown in Fig. 9 and will be wide open. During the feed movement, the stop-bar 375 is pulled under the roller 492 because the stop-bar 375 is connected through the sleeve-member 376, stop-rod 370 and link 371 (Figs. 9 and 5) to the work head. The rapid feed movement will proceed until the cutter is about to strike the work. At this point, the roller 492 will reach the beveled portion 495 of the cam-plate 493 and begin to roll up the bevel. This will pull the throttle-valve back to the right, reducing the area of opening of the port 483. Thus the rate of feed will be reduced. In the latter part of the feed movement, the roller 492 will ride up on top of the cam-plate 493 to the position shown in Fig. 9 and this will cause a very much reduced rate of feed, which is desirable, the deeper the cutter cuts into the tooth space.

The feed movement will continue until the stop-plate 395 which is carried by the stop-bar 375 (Fig. 8) strikes the projection 393 of the column 40 (Figs. 16 and 18). The cutter will now be in full depth engagement with the work. At the moment that the stop plate 395 strikes the projection 393, or an instant before, it will also strike the projection 402 (Figs. 16 and 8) of the lever 403. This will shift the roll pilot-valve 396 (Figs. 8 and 26) back to the position shown in Fig. 8 and the generating roll will begin, as above described. The cutter and blank will roll together and in this rolling motion, the cutter will cut and generate the profiles of the tooth space of the blank.

As the cycle of operation from the point of beginning of the generating roll has already been described in detail, it need not be described again. It is sufficient to say that the cycle of operation is repeated for each tooth space to be cut into the blank. The work is first fed into the cutter. At the end of the feed movement, the feed is stopped by engagement of the stop 395 with the lug 393 and the stop 395 also trips the lever 403 (Figs. 8 and 16). Then the generating roll takes place and the cutter and blank roll together. The generating roll continues until the adjustable stop 450 strikes the block 457 (Figs. 15 and 26). The stop 450 also shifts the lever 454 and feed pilot valve 426 at the end of this movement. This causes the work to be withdrawn from the cutter. The withdrawal continues until the stop 385 (Figs. 8 and 26) strikes the projection 393 (Figs. 8 and 15). The stop 385 at the end of its movement also trips the lever 403 that controls the roll pilot valve 396. This causes the return roll of the cradle to take place. The return roll continues until the fixed stop 451 (Figs. 15 and 26) strikes the block 457. The stop 451 also strikes the short arm of the lever 454, at the end of its movement. This again shifts the feed pilot valve 426 and causes the feed to begin anew. So the cycle proceeds for each tooth space, first feed of the work into the cutter, then the generating roll after full depth position is reached, then withdrawal of the work from the cutter, and then the return roll with the indexing of the blank.

During each feed movement, the plunger 501 of the automatic stop-mechanism 500 (Fig. 9) is pushed in when the roller 492 of the lever 490 rises onto the top of the cam-plate 493 and on each withdrawal movement, the plunger is released when the roller drops down onto the bottom of the groove 494 in the feed stop-bar 375. Thus, the automatic stop-mechanism is ratcheted forward with each feed movement.

The automatic stop-mechanism is set, as already mentioned, for the number of tooth spaces to be cut into the blank. On the last feed movement, then, the automatic stop-mechanism will be tripped. This will cause the lever 504 (Fig. 8) to be rocked about its pivot 514 and the lever 506 will be swung in a clockwise direction about its pivot 491 through operation of the link 505 which connects the lever 506 with the lever 504. This will cause the lever 508 to be swung in a counter-clockwise direction about its pivot 509 through the link-connection 507 between the levers 506 and 508. The lever 508 carries a roller 510 which engages under the ledge 512 of the stop-member 385 and so the stop-member 385 will be moved upwardly out of operative position.

As soon as the stop-member 385 is raised upwardly, it is locked in that position by the lug 522 of the bell-crank 520 (Figs. 16 and 17) for this bell-crank is immediately swung into locking position by the plunger 524.

During the generating roll, and withdrawal the stop 385 remains locked up out of operative position. When withdrawal of the work takes place, then, the stop 385 is not in position to limit the amount of withdrawal and so the withdrawal continues until the stop 515 (Figs. 8, 9 and 26) strikes the stop 516. Thus, the work is moved to loading position.

During the movement of the work to loading position, the plate 600 (Fig. 9) will strike the dog 595, swinging the lever 592 about its pivot 593 and disengaging the catch 590 from the plunger 582. This will allow the plunger 582 to drop under actuation of the spring 587 and, as soon as the plate 600 has passed entirely under the plunger, the plunger will drop down into the bottom of the groove 602 in the stop-bar 375.

This movement of the plunger will cause the valve 485 to be shifted to the right from the position shown in Fig. 9. This will put the cylinder 548 (Fig. 6) on supply from the line 460 (Figs. 9 and 26) through the ports 565 and 572 and line 573 (Figs. 6, 9 and 26). This will force the piston 547 to the right in the cylinder 548 and release the chucking mechanism.

At the same time, the right-hand end of the cylinder 667 (Figs. 19, 20 and 26) will be put on supply from the line 460 (Figs. 9 and 26) through the ports 565 and 572, duct 573 and the duct 705 (Figs. 9, 19 and 26) which is connected to the duct 573. The left-hand end of the cylinder 667 will be put on exhaust through the duct 706, duct 708, ports 708 and 567 and duct 463 (Figs. 19, 9 and 26).

This will cause the piston 665 to be moved to the left from the position shown in Figs. 19 and 20. As soon as this piston begins to move to the left, the centering-pin 654 is withdrawn from engagement with the work because the lever 658 follows the leftwardly moving piston-rod 660 under actuation of the spring plunger 661. As the piston 665 moves to the left, also, the cam-slot 697 of the cylindrical enlargement 698 of the piston-rod 660 through its engagement with the roller 695, causes the lever-arm 687 to be rocked upwardly about its pivot 688 and so the rod 689 is forced upwardly to release the catch 675 (Figs. 19, 20, 21 and 22).

In the further movement of the piston 665 to the left, the cam roller 700 rolls into the slot 702 of the cylindrical projection 698 and immediately after the catch 685 has been disengaged, this roller causes the piston-rod 660 to be rotated. The piston-rod is keyed to the arm 650 and so the arm is rotated to swing the centering-pin 654 and arm 659 back out of operating position.

During the movement of the work head to loading position, then, the completed gear is dechucked, the centering-pin 654 is withdrawn from engagement with the blank, the arm 650 which carries the centering-pin is unlatched and the arm itself is swung back out of operating position so that it clears the work. When the work head has reached loading position, the operator only needs to push on the knob 640 of the stripper-valve 625 (Figs. 10 and 26) to strip the completed pinion from the work-arbor.

This puts the left-hand end of the cylinder 616 on supply (Fig. 6) from the duct 632 through the ports 633 and 638 and the line 639 (Figs. 10, 6 and 26). The piston 618 is accordingly moved to the right from the position shown in Fig. 6 and this causes the lever 610 to be swung about its pivot 611, forcing the stripper-rod 560 inwardly in the work spindle to push the pinion P forward out of the spindle so that it can be readily grasped and lifted out of the spindle by the operator of the machine.

When the machine is built with a gear drive such as has already been described and such as is shown in detail in the diagram of Fig. 27, the hydraulic braking mechanism of Fig. 7 operates to take up back-lash only in the gear train which drives the work spindle. Under some conditions and especially where a machine is to be employed for finish-cutting, it may be desirable to rearrange the gearing so that this brake mechanism may function also to take up back-lash in the train of gearing which drives the cradle. A drive in which the brake mechanism will be effective to take up the back-lash both in the drive to the work spindle and the drive to the cradle is illustrated diagrammatically in Fig. 28. Identical parts in this figure and in Fig. 27 are designated by identical reference numerals.

Figure 28:
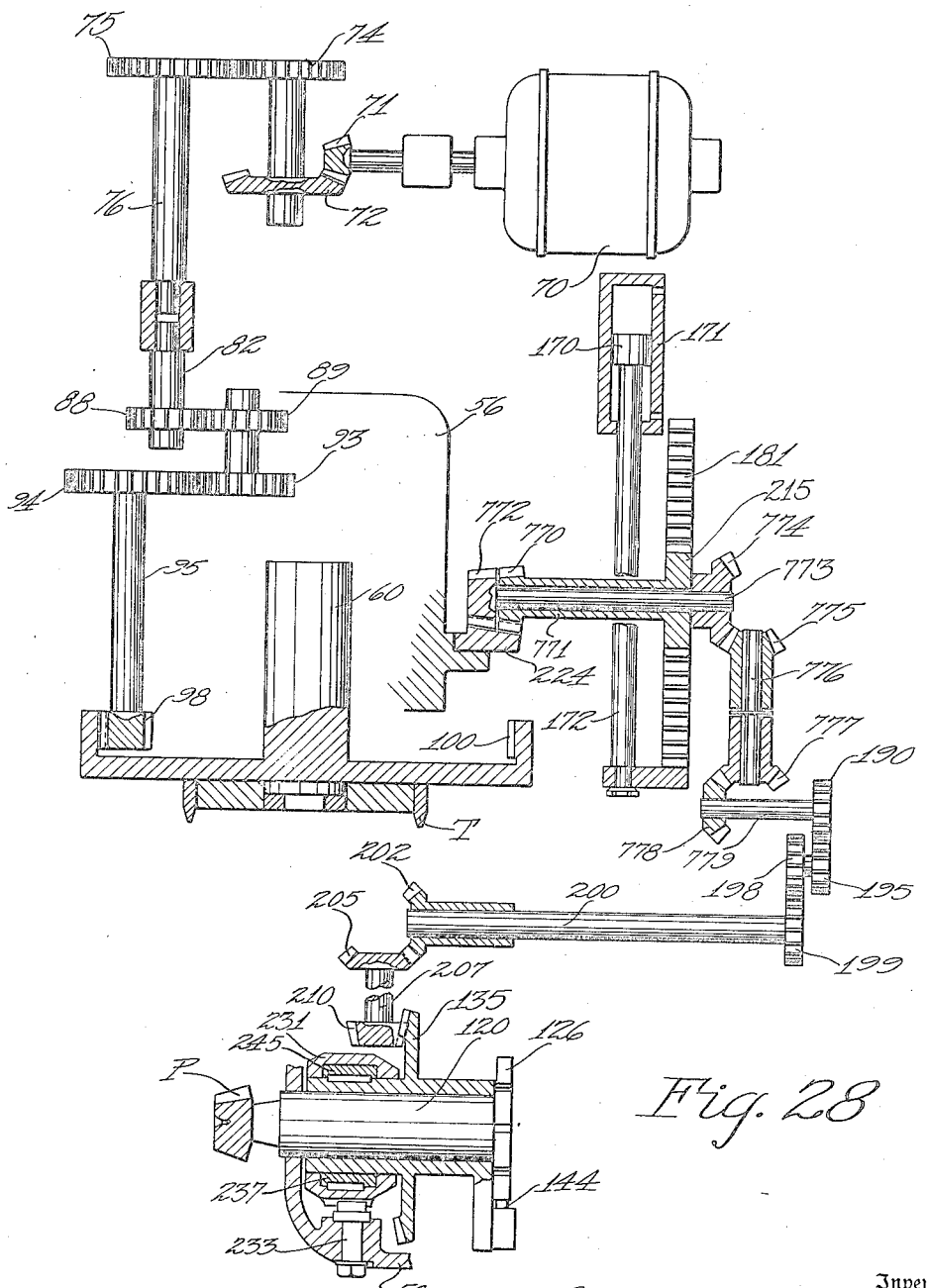
Fig. 28 is a drive diagram showing a possible alternative construction.

When the machine is constructed to operate as illustrated in Fig. 28, the rack 180 is eliminated. The cradle 56 is driven from the rack 181 through the gear 215, as before. This gear 215 is connected to a bevel pinion 770, that corresponds to the bevel pinion 222 of Fig. 27 and this bevel pinion meshes with the bevel gear 224 carried by the cradle to drive the cradle. The bevel gear 224 then drives a bevel pinion 772, which is mounted coaxially with the bevel pinion 770. The bevel pinion 772 is secured to a shaft 773 that is journaled in the hollow shaft 771 to which the bevel pinion 770 is secured. The shaft 773 carries at its outer end a bevel gear 774. This bevel gear meshes with another bevel gear 775 that has a splined connection with a shaft 776. The bevel gear 777 has a splined connection with the shaft 776 and drives a bevel gear 778 that is keyed to the shaft 779 to which the spur gear 190 is secured. The remainder of the drive to the work spindle is the same as in the machine illustrated in Fig. 27.

Now, when a train such as shown in Fig. 28 is used, it will be seen that the braking action placed on the paddle 245 (Figs. 28 and 7) by throttling the exhaust from the drum 231 will be transmitted back through the gearing 135, 210, 205, 202, 199, 198, 195, 190, 758, 777, 775, 774, 772, 224, 770 and 215 to the rack 181. Thus, the back-lash will be taken out of the whole train including not only the drive to the work spindle but also the drive to the cradle.

While the invention has been described in connection with a machine for cutting bevel gears, it will be understood that various features of the invention are applicable to the manufacture of other types of gears, also, and that, moreover, the invention is not restricted to cutting machines, but may be applied to other methods for manufacturing gears. Certain features of the invention, furthermore, are applicable to other types of machines than machines for producing gears. In general, it may be said that while the invention has been described in connection with particular embodiments thereof, it will be understood that it is capable of further modification and use and that this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, a work support, a tool support, a work spindle journaled in the work support, tool mechanism mounted on the tool support, and means for swinging the work support about an axis located at a point intermediate the length of the work spindle and perpendicular to a plane containing the axis of the work spindle to produce alternate movements of feed and withdrawal between the work and the tool mechanism and means for indexing the work spindle during the periods of withdrawal.

2. In a machine for producing gears, a work support, a tool support, a work spindle journaled in the work support, tool mechanism mounted on the tool support, means for rotating the work spindle comprising a pair of hypoid gears, one of which is mounted coaxially of the work spindle and operatively connected to the same at a point intermediate the length of the work spindle and the other of which is angularly disposed to and offset from the axis of the work spindle and lying between the axis of the work spindle and the plane of operation of the work and tool mechanism, and means for swinging the work support about the axis of the last named gear to produce alternate movements of feed and withdrawal between the tool mechanism and the work.

3. In a machine for producing gears, a work support, a tool support, a work spindle journaled in the work support, tool mechanism mounted on the tool support, a train of gearing for rotating the work spindle relative to the work support, and means operated by the relative movement between the work spindle and the work support during operation of the tool mechanism for applying a load to said train of gearing to take up the back-lash in said train.

4. In a machine for producing gears, a rotatable member, a train of gearing for rotating said member and means for taking up back-lash in said train comprising a relatively stationary drum adapted to contain liquid, said drum being formed with a partition-wall which projects into the drum-chamber, a paddle-member secured to the rotatable member and projecting into the drum-chamber, means for exhausting from the drum, liquid entrapped between the paddle and wall, and means for throttling the exhausting liquid.

5. In a machine for producing gears, a work support, a tool support, a work spindle journaled in the work support, tool mechanism mounted on the tool support, a movable carrier in which one of said supports is mounted, a train of gearing for actuating said carrier, a train of gearing for simultaneously rotating the work spindle, one of said trains being driven from the final element of the other train, and a single means operative on the final element of the driven train to take up the back-lash in both of said trains simultaneously.

6. In a machine for producing gears, a work support, a tool support, a work spindle journaled in the work support, tool mechanism mounted on the tool support, a movable carrier in which one of said supports is mounted, a train of gearing for actuating said carrier, a train of gearing for simultaneously rotating the work spindle, a single gear element for actuating both of said trains simultaneously, and a single means operative on the final element of one of said trains to take up the backlash in both of said trains simultaneously.

7. In a machine for producing gears, a work support, a tool support, a work spindle journaled in the work support, tool mechanism mounted on the tool support, a movable carrier on which one of said supports is mounted, means for actuating said carrier, a train of gearing for rotating the work spindle in timed relation to the movement of the carrier to produce a relative rolling movement between the tool mechanism and the work, and means actuated by the relative movement between the work spindle and the work support during operation of the tool mechanism for taking up the back-lash in said train of gearing.

8. In a machine for producing gears in a periodic indexing operation, a work support, a tool support, tool mechanism mounted on the tool support, means for producing relative rolling movements between the tool mechanism and the work at a predetermined ratio to generate the tooth profiles, and means operable at a predetermined point in each rolling movement while the tool mechanism is operating on the work to vary the rate of said rolling movement and means for indexing the work after each generating operation.

9. In a machine for producing gears in a periodic indexing operation, a work support, a tool support, a work spindle journaled in the work support, tool mechanism mounted on the tool support, means for producing relative rolling movements between the tool mechanism and the work to generate the tooth profiles, means for indexing the work after each generating operation, and means for controlling the rate of said rolling movements while the tool mechanism is in engagement with the work and adapted to produce a substantially uniform rate of roll during the first part of each rolling movement and an accelerated rate of roll during the latter part of each rolling movement.

10. In a machine for producing gears, a work support, a tool support, a work spindle journaled in the work support, tool mechanism mounted on the tool support, fluid-pressure operated means comprising a cylinder and a piston reciprocable therein, for producing a relative rolling movement between the tool mechanism and the work, a throttle-valve adjustable to predetermine the normal rate of said rolling movement, and means operable, when a predetermined adjustable point in the roll is reached, to move said throttle-valve to vary the rate of roll.

11. In a machine for producing gears, a frame, a work support mounted on the frame, a full circular cradle journaled in the frame for rotatable adjustment and movement and having a full circular bearing, a tool support journaled eccentrically in the bearing of said cradle for rotatable adjustment therein through an angle of 360° about an axis parallel to the axis of the cradle, a cutter spindle journaled eccentrically in the tool support for rotation about an axis parallel to the axis of the tool support, a face-mill gear cutter secured to said cutter spindle, means for rotating the cradle and means for rotating the cutter, said last-named means comprising a shaft journaled in the frame coaxially of the cradle, a shaft journaled in the tool support coaxially of said tool support and driven from the first-named shaft, and means driven by the last-named shaft for rotating said cutter.

12. In a machine for producing gears, a frame, tool mechanism mounted on the frame, a work support swingably mounted on the frame for movement about an axis lying between the axis of the work spindle and the plane of engagement of the tool mechanism and the work, means for swinging said work support on its axis to impart alternate movements of feed and withdrawal to the work, said means comprising a cylinder and a piston reciprocable therein, said piston being so positioned and connected to the work support as to operate in a direction approximately in line with the point of engagement of the tool mechanism with the work means for applying fluid-pressure alternately to opposite sides of said piston and means for indexing the work support during the periods of withdrawal.

13. In a machine for producing gears, a work support, a tool support, a work spindle journaled in the work support, a movable carrier upon which one of said supports is mounted, tool mechanism mounted on the tool support, a train of gearing including a set of change gears having teeth around their full periphery for driving the work spindle and cradle in timed relation to produce a relative rolling movement between the tool mechanism and the work, and means for periodically indexing the work spindle, said indexing means comprising a notched-plate secured to the work spindle, means adapted to lock said plate to said gearing, and means operable by the relative movement between the work spindle and the work support for periodically disconnecting said locking means and connecting the work spindle to the work support to effect indexing.

14. In a machine for producing gears, a work support, a tool support, a work spindle journaled in the work support, a movable carrier upon which one of such supports is mounted, tool mechanism mounted on the tool support, means for actuating the work spindle and carrier in timed relation to effect relative rolling movement between the tool mechanism and the work comprising a reciprocable rack, gearing connecting the rack with both the work spindle and the cradle and means for periodically reversing the direction of movement of the rack, and means for periodically indexing the work spindle comprising a notched plate secured to the work spindle, means adapted to lock said plate during cutting to the gearing actuating the work spindle, and means operable by the relative movement between the work spindle and the work support for periodically disconnecting the locking means and connecting the work spindle to the work support to effect indexing of the work.

15. In a machine for producing gears, a work support, a tool support, a work spindle journaled in the work support, tool mechanism mounted on the tool support, a movable carrier upon which one of said supports is mounted, means for actuating the carrier and simultaneously rotating said work spindle comprising a reciprocable rack, gearing operatively connecting the rack with the work spindle, gearing operatively connecting the rack with the carrier, a cylinder and a piston reciprocable therein, means connecting one of the last two members with the rack, and means for applying fluid-pressure alternately to opposite sides of said piston.

16. In a machine for producing gears, tool mechanism, a work support, a work spindle journaled in the work support, fluid-pressure operated means for reciprocating said work support, a reversing-valve for controlling the direction of application of the pressure fluid, stops for operating said valve and limiting the movement of said work support to cause alternate movements of feed and withdrawal between said supports, means for indexing the work spindle during the periods of withdrawal, and means operable automatically on completion of a gear to render one of said stops inoperative to allow said work support on the subsequent withdrawal movement to move to inoperative loading position.

17. In a machine for producing gears, a work support, a tool support, a work spindle journaled in a work support, tool mechanism mounted on the tool support, a movable carrier on which one of said supports is mounted, a reciprocable rack, a train of gearing operatively connecting the rack with the carrier to drive the same, a train of gearing operatively connecting the rack with the work spindle to drive the work spindle in time with the carrier, one of said trains including a set of change gears for determining the relative ratio of movement of the work spindle and carrier on movement of the rack, means for reciprocating the rack to impart movement to said two trains of gearing and periodically to reverse the same, and means for periodically indexing the work spindle.

18. In a machine for producing gears, a work support, a tool support, a work spindle journaled in the work support, tool mechanism mounted on the tool support, a rotatable cradle on which one of said supports is mounted, a pair of tapered gears for actuating the cradle, one of which is secured to the cradle, a second pair of tapered gears for rotating the work spindle one of which is connected to the spindle during operation on the gear teeth, a rack, trains of gearing connecting the rack, respectively to the two pairs of tapered gears to actuate the same on movement of the rack including a set of change gears governing the ratio of cradle and work spindle movements, means for reciprocating the rack to actuate said trains of gearing and periodically reverse the same, and means for periodically indexing the work spindle.

19. In a machine for producing gears, a frame, a tool support mounted on the frame, tool mechanism mounted on the tool support, a column adjustably mounted on the frame to permit of adjustment of the work-piece into operative relation with the tool mechanism, a column adjustably mounted on the frame to permit of adjustment of the work into operative relation with the tool mechanism, a work support pivotally mounted in the column, a single one-piece overhead tie rigidly connected at one end to the tool support and at its opposite end to the column and extending over the area occupied by the work and tool mechanism, and means for periodically swinging the work support about its pivot to alternately feed the work into the tool mechanism and withdraw the same therefrom for indexing.

20. In a machine for producing gears, a work support, a tool support, a work spindle journaled in the work support, tool mechanism capable of operating on opposite sides of a tooth space simultaneously mounted on the tool support, means for producing a relative rolling movement between the tool mechanism and the work, means for controlling the rolling movement so that said rolling movement is at a relatively slow rate while the tool mechanism is operating on both sides of a tooth space and said rolling movement is at a relatively accelerated rate when the tool mechanism is operating on one side of the tooth space only, and means for periodically indexing the work.

21. In a machine for producing gears, a work support, a tool support, a work spindle journaled in the work support, tool mechanism mounted on the tool support and adapted to operate simultaneously on opposite sides of a tooth-space of the gear to be cut, means for producing relative rolling movement between the tool mechanism and the work, means for controlling such rolling movement so that it proceeds at a uniform rate for the first part of the generating roll and then accelerates, and means for periodically indexing the work.

22. In a machine for producing gears, a work support, a tool support, a work spindle journaled in the work support, tool mechanism mounted on the tool support, a movable carrier upon which one of said supports is mounted, means for actuating the carrier and work spindle in timed relation to generate the tooth profiles comprising a reciprocable rack, a train of gearing operatively connecting the rack with the work spindle, a train of gearing operatively connecting the rack with the carrier, means for actuating said rack at a varying velocity during its movement in one direction and means for periodically indexing the work.

23. In a machine for producing gears, a work support, a tool support, a work spindle journaled in the work support, tool mechanism mounted on the tool support, a movable carrier upon which one of said supports is mounted, means for actuating said carrier and work spindle in timed relation to generate the tooth profiles comprising a reciprocable rack, a train of gearing operatively connecting the rack with the work spindle, a train of gearing operatively connecting the rack with the carrier, fluid-pressure operated means for actuating said rack at a varying velocity during its movement in one direction, a throttle valve controlling the speed of said movement, and means for varying the opening of said throttle valve during movement in said direction to vary the rate of said movement and means for periodically indexing the work.

24. In a machine for producing gears, a work support, a tool support, a work spindle journaled in the work support, tool mechanism mounted on the tool support, a movable carrier upon which one of said supports is mounted, trains of gearing for actuating the carrier and work spindle in timed relation to generate the tooth profiles, means for resisting rotation of said trains of gearing to take up back-lash in said trains, means for driving said trains at a varying rate and means for controlling said resisting means so as to allow said trains to move at said varying rate while maintaining the resistance substantially uniform.

25. In a machine for producing gears in an intermittent indexing operation, a work support, a tool support, a work spindle journaled in the work support, tool mechanism mounted on the tool support, a movable carrier upon which one of said supports is mounted, means for actuating the carrier and work spindle in timed relation to produce relative rolling movements between the work and tool mechanism, means driven in timed relation with the carrier and work spindle for varying the rate of the rolling movement during generation of the tooth profiles and means for periodically indexing the work.

26. In a machine for producing gears, a work support, a tool support, a work spindle journaled in the work support, tool mechanism mounted on the tool support, a movable carrier upon which one of said supports is mounted, fluid-pressure operated means for actuating the carrier and work spindle in timed relation to produce a relative rolling movement between the work and the tool mechanism, a throttle valve for controlling the rate of operation of said fluid-pressure operated means and a cam driven in time with the carrier and work spindle movements for controlling the opening of said throttle valve.

27. In combination, a work spindle, a tail-stock movable to and from operative position, centering pin rotatably mounted in the tail-stock and movable axially therein to and from operative position, means for locking the tail-stock in operative position, and a single means operable to move said centering pin from operative position, release said locking means, and move said tail-stock out of operative position.

28. In combination, a work spindle, a tail-stock movable to and from operative position, a centering pin rotatably mounted in the tail-stock and movable axially therein to and from operative position, means for locking the tail-stock in operative position, and a single means operable to move said tail-stock, said locking means and said centering pin to operative positions.

29. In combination, a work spindle, a tail-stock, a centering pin rotatably mounted in the tail-stock and movable axially therein to and from operative position, means for locking the tail-stock in operative position, and a single means controlling the operation of said parts so that successively the tail-stock is moved to operative position, locked therein, and then the centering pin is moved into engagement with the blank carried by the work spindle.

30. In a machine for producing gears, a work support, a work spindle journaled in the work support, a tail-stock mounted on the work support and movable to and from operative position, means for locking the tail-stock in operative position, a centering pin rotatably mounted on the tail-stock and movable axially therein to and from operative position, and a single cam member controlling the tail-stock, locking means and centering pin and movable in one direction to actuate all said parts successively.

31. In a machine for producing gears, a work support, a work spindle journaled in the work support, chucking means for securing a gear blank to the work spindle, a tail-stock mounted on the work support, a centering pin rotatably mounted in the tail-stock and movable axially therein to and from operative position, and means for automatically dechucking the work and withdrawing centering pin from operative position when the operations on the work have been completed.

32. In a machine for producing gears, a train of gearing, and means for taking up back-lash in said train comprising a relatively fixed and closed member adapted to contain liquid, a member movable in said fixed member and operatively connected to said train, means for throttling liquid exhausting from between said members when the train of gearing is rotating in one direction, and means for supplying liquid under pressure between said members when the train is rotating in the opposite direction whereby to take up back-lash in said train in the same direction in both directions of rotation of said train.

33. In combination, a train of gearing and a back-lash take-up mechanism for said train comprising a relatively fixed and closed member adapted to contain liquid, a member operatively connected to said train and movable in the first member on actuation of said train, and means for throttling exhaust of liquid from between said members on movement of the latter member in the first.

34. In a machine for producing gears, a work support, a tool support, a work spindle journaled in the work support, tool mechanism mounted on the tool support, a movable carrier upon which one of said supports is mounted, a train of gearing for actuating the carrier and work spindle in timed relation to generate the tooth profiles, fluid-pressure operated means for taking up back-lash in said train, fluid-pressure operated means for actuating said train, a throttle valve for controlling the rate of movement of said train, means for varying the opening of said throttle valve to vary the rate of said movement, and means operatively connecting the first named fluid-pressure operated means to said throttle valve so as to allow said train to move at a varying rate while the back-lash therein is continuously taken up.

35. In a machine for producing gears, a work support, a tool support, a work spindle journaled in the work support, tool mechanism mounted on the tool support, a movable carrier upon which one of said supports is mounted, a train of gearing for actuating the carrier and work spindle in timed relation to generate the tooth profiles, means for taking up back-lash in said train comprising a relatively fixed and closed member adapted to contain liquid, a member operatively connected to said train of gearing and movable in the first member on actuation of said train, a throttle valve controlling exhaust of liquid from said first member on relative movement between said members, fluid-pressure operated means for actuating said train, means connecting the last named means to said throttle valve so that said throttle valve controls the speed of operation of said train, and means for varying the opening of said throttle valve during movement of said train.

36. In a machine for producing gears, a work support, a tool support, a work spindle journaled in the work support, tool mechanism mounted on the tool support, a movable carrier upon which one of said supports is mounted, a train of gearing for actuating the carrier and work spindle in timed relation to generate the tooth profiles, means for taking up back-lash in said train comprising a relatively fixed and closed member adapted to contain liquid, a member operatively connected to said train of gearing and movable in the fixed member on actuation of said train, a throttle valve controlling exhaust of liquid from between said members when the movable member is moving in one direction, means for supplying liquid under pressure between said members when the movable member is moving in the opposite direction, fluid-pressure operated means for actuating said train, and a reverse valve for controlling said fluid-pressure operated means and also exhaust from and supply of liquid to said relatively fixed member.

37. In a machine for producing gears, a tool support, tool mechanism mounted on the tool support, a column having opposed and aligned bearings formed therein, a work support, a work spindle journaled in said work support, means for pivotally mounting said work support between the bearings of said column for movement about an axis located at a point intermediate the length of the work spindle and offset from the axis of the work spindle between the axis of the work spindle and the plane of operation of the tool mechanism, a piston so positioned and connected to the work support at the opposite side of the work spindle axis as to move approximately in a direction in line with the point of operation of the tool mechanism on the work, and means for applying fluid-pressure alternately in opposite directions to said piston to feed the work into and withdraw it from operative position alternately.

38. In a machine for producing gears, a work support, a work spindle journaled in the work support, a tool support, tool mechanism mounted on the tool support, a movable carrier on which one of such supports is mounted, means for actuating said carrier, means including a train of gearing for rotating the work spindle in timed relation to the carrier movement to produce a generating roll between the tool mechanism and the work, means for taking up backlash in said train of gearing comprising a chamber adapted to contain liquid, a member movable in this chamber and operable by relative movement between the work spindle and the work support, means for exhausting from such chamber liquid entrapped by the last-named relative movement, a throttle valve controlling the rate of such exhaust when the work spindle is rotating in one direction, and means for varying the opening of said throttle valve during the generating roll.

39. In combination, a work spindle, a tail stock movable to and from operative position, a centering pin rotatably mounted in said tail stock and movable axially therein to and from operative position, means for locking the tail stock in operative position, a cylinder and a piston reciprocable therein, and means operatively connecting the piston to the tail stock, the locking means and the centering pin, whereby each of said named parts is operated successively on movement in one direction of the piston.

40. In combination a work spindle, a tail stock movable to and from operative position, a centering pin rotatably mounted in the tail stock and movable axially therein to and from operative position, means for locking the tail stock in operative position, a cylinder and a piston reciprocable therein, means operatively connecting said piston to the tail stock, the locking means and the centering pin, said connections being so arranged that the three parts are operated successively in one order upon movement of the piston in one direction and in the reverse order on movement of the piston in the opposite direction, and means for supplying fluid pressure to opposite sides of said piston.

41. In combination, a work spindle, a tail stock movable to and from operative position, a centering pin rotatably mounted in said tail stock and movable axially therein to and from operative position, means for locking the tail stock in operative position, a cylinder and a piston reciprocable therein, means connecting the piston to the tail stock so that the two rotate together but the piston is free to reciprocate independently of the tail stock, means operatively connecting the piston to the locking means and the centering pin, said piston being formed with a longitudinal cam slot, and a stationary follower adapted to engage said cam slot to rotate said piston and tail stock upon movement of said piston, said follower and the operative connections to the locking means and centering pin, respectively, being so arranged that the three parts are operated successively in one order upon movement of the piston in one direction and in the reverse order upon movement of the piston in the opposite direction.

42. In a machine for producing gears, tool mechanism adapted to operate alternately upon opposite side surfaces of a gear blank, a work spindle, a train of gearing for rotating the work spindle in one direction during operation of the tool mechanism, and means for continuously exerting upon the final member of said train a torque in a predetermined direction which is greater than the changing thrusts produced by the alternate operations of the tool mechanism.

43. In a machine for producing gears, a rotary work spindle, a face-mill cutting tool having different blades which are arranged to cut on opposite side tooth surfaces of a gear, a train of gearing for rotating the work spindle, and means for continuously exerting upon the final member of said train a torque in a predetermined direction which is greater than the changing thrusts produced by the oppositely directed cuts of the different blades of the tool.

44. In a machine for producing gears, a work support, a tool support, tool mechanism mounted on the tool support, a work spindle journaled in the work support, an oscillatory cradle upon which one of said supports is mounted, means for oscillating the cradle, a train of gears including a set of ratio change gears, for rotating the work spindle in timed relation with the cradle upon movement of the cradle, and means connecting the last gear in said train to the work spindle and adapted to exert a torque upon all the preceding members of the train to take up backlash in the train.

45. In a machine for producing gears, a work spindle, a tool support, tool mechanism mounted on the tool support, means for producing a relative rolling movement between the tool mechanism and the work at a predetermined ratio to generate the tooth profiles, and means operable at a predetermined point in the rolling movement, while the tool mechanism is operating upon the work, to vary the rate of the rolling movement.

LEONARD O. CARLSEN.